(12) United States Patent
Hunter et al.

(10) Patent No.: US 10,483,832 B2
(45) Date of Patent: Nov. 19, 2019

(54) MULTI-BAR LINKAGE ELECTRIC DRIVE SYSTEM

(71) Applicant: Indigo Technologies, Inc., Cambridge, MA (US)

(72) Inventors: Ian W. Hunter, Lincoln, MA (US); Timothy A. Fofonoff, Cambridge, MA (US); Peter G. Madden, Burlington, MA (US); Dean Ljubicic, Somerville, MA (US); Thomas Moriarty, Lexington, MA (US); Scott T. Purchase, Cambridge, MA (US)

(73) Assignee: Indigo Technologies, Inc., Cambridge, MA (US)

( * ) Notice: Subject to any disclaimer, the term of this patent is extended or adjusted under 35 U.S.C. 154(b) by 0 days.

(21) Appl. No.: 15/701,766

(22) Filed: Sep. 12, 2017

(65) Prior Publication Data

US 2018/0072120 A1 Mar. 15, 2018

Related U.S. Application Data

(60) Provisional application No. 62/512,469, filed on May 30, 2017, provisional application No. 62/393,982, filed on Sep. 13, 2016.

(51) Int. Cl.
*H02K 16/04* (2006.01)
*B60K 7/00* (2006.01)
(Continued)

(52) U.S. Cl.
CPC ............. *H02K 16/04* (2013.01); *B60G 1/00* (2013.01); *B60G 3/20* (2013.01); *B60G 7/001* (2013.01);
(Continued)

(58) Field of Classification Search
CPC ........ H02K 16/04; H02K 7/075; H02K 7/116; H02K 7/086; H02K 7/006; H02K 7/125;
(Continued)

(56) References Cited

U.S. PATENT DOCUMENTS 1,886,040 A 11/1932 Moodyman
2,991,377 A 7/1961 Vose et al.
(Continued)

FOREIGN PATENT DOCUMENTS

CN 1028337 C 5/1995
CN 1399402 A 2/2003
(Continued)

OTHER PUBLICATIONS

International Search Report and Written Opinion of the International Searching Authority for International Application No. PCT/US2017/051073, entitled: "Multi-Bar Linkage Electric Drive System", dated Nov. 30, 2017.
(Continued)

*Primary Examiner* — James A English
(74) *Attorney, Agent, or Firm* — Smith Baluch LLP

(57) ABSTRACT

An electric drive system including: a rotary motor system including a hub assembly, a first rotating assembly, a second rotating assembly, and a third rotating assembly, wherein the hub assembly defines a rotational axis about which the first rotating assembly, the second rotating assembly, and the third rotating assembly are coaxially aligned and are capable of independent rotational movement independent of each other; a multi-bar linkage mechanism connected to each of the first and third rotating assemblies and connected to the hub assembly and constraining movement of the hub assembly so that the rotational axis of the hub assembly moves along a defined path that is in a transverse direction relative to the rotational axis and wherein the multi-bar linkage
(Continued)

mechanism causes the rotational axis of the hub assembly to translate along the defined path in response to relative rotation of the first rotating assembly and the third rotating assembly with respect to each other.

22 Claims, 26 Drawing Sheets

(51) Int. Cl.
| | |
|---|---|
| H02K 1/27 | (2006.01) |
| H02K 7/00 | (2006.01) |
| H02K 7/08 | (2006.01) |
| H02K 7/116 | (2006.01) |
| B60G 3/20 | (2006.01) |
| B60G 1/00 | (2006.01) |
| B60G 7/00 | (2006.01) |
| B60G 17/015 | (2006.01) |
| H02K 1/28 | (2006.01) |
| B60K 17/04 | (2006.01) |

(52) U.S. Cl.
CPC .......... *B60G 17/015* (2013.01); *B60K 7/0007* (2013.01); *H02K 1/2793* (2013.01); *H02K 1/28* (2013.01); *H02K 7/006* (2013.01); *H02K 7/086* (2013.01); *H02K 7/116* (2013.01); *B60G 3/207* (2013.01); *B60G 2202/42* (2013.01); *B60G 2204/30* (2013.01); *B60G 2204/421* (2013.01); *B60G 2300/50* (2013.01); *B60G 2500/30* (2013.01); *B60K 17/043* (2013.01); *B60K 2007/003* (2013.01); *B60K 2007/0038* (2013.01); *B60K 2007/0092* (2013.01); *B60L 2220/44* (2013.01); *B60L 2220/46* (2013.01); *B60Y 2200/91* (2013.01)

(58) Field of Classification Search
CPC .......... H02K 1/28; H02K 1/2793; B60G 3/01; B60G 3/20; B60G 3/207; B60G 7/001; B60G 1/00; B60G 17/015; B60G 2204/30; B60G 2204/421; B60G 2202/42; B60G 2500/30; B60G 2300/50; B60K 7/0007; B60K 2007/0038; B60K 2007/0092; B60K 2007/003; B60L 2220/46; B60L 2220/44; B60Y 2200/91
See application file for complete search history.

(56) References Cited

U.S. PATENT DOCUMENTS

| | | |
|---|---|---|
| 3,118,432 A | 1/1964 | Peterson |
| 3,289,886 A | 12/1966 | Goldsholl et al. |
| 3,479,541 A | 11/1969 | Robinson |
| 3,575,341 A | 4/1971 | Tarver |
| 3,799,035 A | 3/1974 | Lamm |
| 3,964,450 A | 6/1976 | Lockshaw |
| 4,179,630 A | 12/1979 | Stuber |
| 4,228,373 A | 10/1980 | Funderburg |
| 4,253,079 A | 2/1981 | Brosh |
| 4,300,067 A | 11/1981 | Schumann |
| 4,345,174 A | 8/1982 | Angus |
| 4,384,221 A | 5/1983 | Brandly |
| 4,404,503 A | 9/1983 | Ward et al. |
| 4,473,763 A | 9/1984 | Mcfarland |
| 4,486,667 A | 12/1984 | Srogi |
| 4,503,751 A | 3/1985 | Pinson |
| 4,507,579 A | 3/1985 | Turner |
| 4,554,989 A | 11/1985 | Gruich et al. |
| 4,618,808 A | 10/1986 | Ish-Shalom et al. |
| 4,675,563 A | 6/1987 | Goldowsky |
| 4,684,834 A | 8/1987 | Hartman, Sr. |
| 4,698,608 A | 10/1987 | Kimble |
| 4,749,898 A | 6/1988 | Suzuki et al. |
| 4,796,511 A | 1/1989 | Eyssa |
| 4,823,039 A | 4/1989 | Lynch |
| 4,920,295 A | 4/1990 | Holden et al. |
| 4,981,309 A | 1/1991 | Froeschle et al. |
| 5,036,930 A | 8/1991 | Bisel et al. |
| 5,164,623 A | 11/1992 | Shkondin |
| 5,179,365 A | 1/1993 | Raggi |
| 5,204,621 A | 4/1993 | Hermann et al. |
| 5,276,372 A | 1/1994 | Hammer |
| 5,301,111 A | 4/1994 | Utsui et al. |
| 5,345,206 A | 9/1994 | Morcos |
| 5,383,680 A | 1/1995 | Bock et al. |
| 5,440,183 A | 8/1995 | Denne |
| 5,535,853 A | 7/1996 | Skalski |
| 5,631,507 A | 5/1997 | Bajric et al. |
| 5,680,201 A | 10/1997 | Veronesi |
| 5,685,798 A | 11/1997 | Lutz et al. |
| 5,696,413 A | 12/1997 | Woodbridge et al. |
| 5,701,039 A | 12/1997 | Parison et al. |
| 5,723,917 A | 3/1998 | Chitayat |
| 5,794,966 A | 8/1998 | Macleod |
| 5,959,374 A | 9/1999 | Anderson et al. |
| 6,113,119 A | 9/2000 | Laurent et al. |
| 6,114,781 A | 9/2000 | Hazelton et al. |
| 6,137,195 A | 10/2000 | Chitayat |
| 6,194,802 B1 | 2/2001 | Rao |
| 6,201,329 B1 | 3/2001 | Chen |
| 6,208,920 B1 | 3/2001 | Izawa et al. |
| 6,211,767 B1 | 4/2001 | Jitaru |
| 6,218,925 B1 | 4/2001 | Iwao |
| 6,239,683 B1 | 5/2001 | Roessler et al. |
| 6,278,204 B1 | 8/2001 | Frenette |
| 6,291,901 B1 | 9/2001 | Cefo |
| 6,293,561 B1 | 9/2001 | Goetzen et al. |
| 6,294,891 B1 | 9/2001 | Mcconnell et al. |
| 6,321,863 B1 | 11/2001 | Vanjani |
| 6,328,123 B1 | 12/2001 | Niemann et al. |
| 6,356,005 B1 | 3/2002 | Hsu |
| 6,385,522 B1 | 5/2002 | Pugh |
| 6,420,953 B1 | 7/2002 | Dadafshar |
| 6,552,450 B2 | 4/2003 | Harty et al. |
| 6,575,078 B1 | 6/2003 | Wright et al. |
| 6,605,939 B1 | 8/2003 | Jansseune et al. |
| 6,675,462 B1 | 1/2004 | Takahashi |
| 6,737,778 B2 | 5/2004 | Daikoku et al. |
| 6,836,036 B2 | 12/2004 | Dube |
| 6,852,061 B2 | 2/2005 | Schoon |
| 6,909,223 B2 | 6/2005 | Miyazawa |
| 6,948,578 B2 | 9/2005 | Prucher |
| 6,974,399 B2 | 12/2005 | Lo |
| 7,055,831 B2 | 6/2006 | Brandenburger |
| 7,059,437 B2 | 6/2006 | Heinen |
| 7,108,090 B2 | 9/2006 | Turner |
| 7,126,233 B2 | 10/2006 | Thomas et al. |
| 7,150,340 B2 | 12/2006 | Beck et al. |
| 7,156,196 B2 | 1/2007 | Katsaros et al. |
| 7,229,079 B2 | 6/2007 | Platner |
| 7,249,643 B2 | 7/2007 | Etzioni et al. |
| 7,252,053 B2 | 8/2007 | Froeschle et al. |
| 7,327,054 B2 | 2/2008 | Ng et al. |
| 7,347,427 B2 | 3/2008 | Heinen et al. |
| 7,357,743 B2 | 4/2008 | Mao et al. |
| 7,384,054 B2 | 6/2008 | Heyring et al. |
| 7,439,839 B2 | 10/2008 | Podlisk et al. |
| 7,557,473 B2 | 7/2009 | Butler |
| 7,579,722 B1 | 8/2009 | Borchert |
| 7,586,217 B1 | 9/2009 | Smith et al. |
| 7,621,167 B2 | 11/2009 | Staffend |
| 7,679,234 B1 | 3/2010 | Tilton et al. |
| 7,902,703 B2 | 3/2011 | Ucer |
| 7,950,356 B2 | 5/2011 | Hyde et al. |
| 7,962,261 B2 | 6/2011 | Bushko et al. |
| 7,965,010 B2 | 6/2011 | Froeschle et al. |
| 8,006,988 B1 | 8/2011 | Turner |
| 8,362,660 B2 | 1/2013 | Hunter |
| 8,519,575 B2 | 8/2013 | Hunter et al. |
| 8,538,615 B2 | 9/2013 | Chen et al. |

(56) References Cited

U.S. PATENT DOCUMENTS

| | | |
|---|---|---|
| 8,585,062 B2 | 11/2013 | Hunter |
| 8,624,699 B2 | 1/2014 | Hunter et al. |
| 8,664,818 B2 | 3/2014 | Calvert |
| 8,688,345 B2 | 4/2014 | Boughtwood |
| 8,688,346 B2 | 4/2014 | Boughtwood |
| 8,742,633 B2 | 6/2014 | Hunter et al. |
| 8,749,192 B2 | 6/2014 | Li et al. |
| 8,766,493 B2 | 7/2014 | Hunter et al. |
| 8,955,626 B2 | 2/2015 | Trueman |
| 9,059,659 B2 | 6/2015 | Burke |
| 9,065,304 B2 | 6/2015 | Boughtwood |
| 9,073,601 B2 | 7/2015 | Carolin |
| 9,150,202 B2 | 10/2015 | Kirby |
| 9,172,287 B2 | 10/2015 | Fofonoff et al. |
| 9,203,341 B2 | 12/2015 | Brooking |
| 9,231,462 B2 | 1/2016 | Hunter et al. |
| 9,291,300 B2 * | 3/2016 | Parker ................ F16M 13/02 |
| 9,325,208 B2 | 4/2016 | Jaganjac |
| 9,358,874 B2 | 6/2016 | Fraser |
| 9,423,463 B2 | 8/2016 | Burke |
| 9,431,939 B2 | 8/2016 | Burke |
| 9,434,229 B2 | 9/2016 | Hilton |
| 9,473,009 B2 | 10/2016 | Hunter et al. |
| 9,509,246 B2 | 11/2016 | Burke |
| 9,525,313 B2 | 12/2016 | Foulsham et al. |
| 9,598,141 B1 | 3/2017 | Doerksen et al. |
| 9,729,092 B2 | 8/2017 | Owen |
| 9,810,552 B2 | 11/2017 | Hunter et al. |
| 9,813,007 B2 | 11/2017 | Burke et al. |
| 9,843,249 B2 | 12/2017 | Hunter et al. |
| 9,914,445 B2 | 3/2018 | Lyon |
| 9,934,904 B2 | 4/2018 | Hunter et al. |
| 9,954,407 B2 | 4/2018 | Foulsham et al. |
| 9,975,431 B2 | 5/2018 | Martin et al. |
| 9,985,490 B2 | 5/2018 | Owen |
| 10,186,933 B2 | 1/2019 | Roberts |
| 10,263,481 B2 | 4/2019 | Roberts |
| 2001/0017497 A1 | 8/2001 | Dobson |
| 2002/0149161 A1 | 10/2002 | Smith |
| 2002/0171528 A1 | 11/2002 | Uchibori et al. |
| 2003/0006653 A1 | 1/2003 | Kang et al. |
| 2003/0034697 A1 | 2/2003 | Goldner et al. |
| 2003/0102723 A1 | 6/2003 | Korenaga |
| 2003/0193250 A1 | 10/2003 | Maslov et al. |
| 2003/0222751 A1 | 12/2003 | Fujiyoshi et al. |
| 2003/0234585 A1 | 12/2003 | Tu et al. |
| 2004/0080124 A1 | 4/2004 | Munday |
| 2004/0100100 A1 | 5/2004 | Wilson |
| 2004/0141861 A1 | 7/2004 | Davis et al. |
| 2004/0198170 A1 | 10/2004 | Tilbor et al. |
| 2004/0245861 A1 | 12/2004 | Miyajima et al. |
| 2004/0263001 A1 | 12/2004 | Yamanaka |
| 2005/0164528 A1 | 7/2005 | Furguth |
| 2005/0173851 A1 | 8/2005 | Lloyd |
| 2005/0200828 A1 | 9/2005 | Tanaka |
| 2005/0212640 A1 | 9/2005 | Chiang et al. |
| 2005/0252706 A1 | 11/2005 | Thomas |
| 2005/0275359 A1 | 12/2005 | Takeuchi et al. |
| 2006/0049701 A1 | 3/2006 | Sato |
| 2006/0071561 A1 | 4/2006 | Chiu et al. |
| 2006/0091635 A1 | 5/2006 | Cook |
| 2006/0108878 A1 | 5/2006 | Lindberg et al. |
| 2006/0125325 A1 | 6/2006 | Beaulieu |
| 2006/0138733 A1 | 6/2006 | Clauson |
| 2006/0208600 A1 | 9/2006 | Sahyoun |
| 2006/0290346 A1 | 12/2006 | Habenschaden et al. |
| 2007/0090697 A1 | 4/2007 | Bittner |
| 2007/0120432 A1 | 5/2007 | Vaden et al. |
| 2007/0176722 A1 | 8/2007 | Podlisk et al. |
| 2007/0216252 A1 | 9/2007 | Shibukawa |
| 2008/0012432 A1 | 1/2008 | Togare et al. |
| 2008/0023237 A1 | 1/2008 | Houle |
| 2008/0067968 A1 | 3/2008 | Binnard et al. |
| 2008/0093913 A1 | 4/2008 | Katsaros |
| 2008/0152463 A1 | 6/2008 | Chidambaram |
| 2008/0265687 A1 | 10/2008 | Chang |
| 2008/0265690 A1 | 10/2008 | Sasaki et al. |
| 2008/0272869 A1 | 11/2008 | Takayama et al. |
| 2009/0090334 A1 | 4/2009 | Hyde et al. |
| 2009/0091196 A1 | 4/2009 | Cooper |
| 2009/0140095 A1 | 6/2009 | Sirohi et al. |
| 2009/0146507 A1 | 6/2009 | Teramachi et al. |
| 2009/0308571 A1 | 12/2009 | Thompson et al. |
| 2010/0033032 A1 | 2/2010 | Tang et al. |
| 2010/0138127 A1 | 6/2010 | Boughtwood |
| 2010/0139600 A1 | 6/2010 | Russell |
| 2010/0176668 A1 | 7/2010 | Murakami et al. |
| 2010/0253465 A1 | 10/2010 | Yeh |
| 2010/0253930 A1 | 10/2010 | Ito |
| 2010/0289347 A1 | 11/2010 | Tu et al. |
| 2011/0050138 A1 | 3/2011 | Li et al. |
| 2011/0080060 A1 | 4/2011 | Camacho |
| 2011/0082388 A1 | 4/2011 | Hunter et al. |
| 2011/0108339 A1 | 5/2011 | Hunter |
| 2011/0109051 A1 | 5/2011 | Hunter |
| 2011/0109174 A1 | 5/2011 | Hunter |
| 2011/0109413 A1 | 5/2011 | Hunter et al. |
| 2011/0193425 A1 | 8/2011 | Hiura et al. |
| 2011/0233364 A1 * | 9/2011 | Breen ................ B60N 2/501 248/421 |
| 2011/0316358 A1 | 12/2011 | Sugita et al. |
| 2012/0186775 A1 | 7/2012 | Fraser |
| 2012/0206073 A1 | 8/2012 | Burke |
| 2012/0283904 A1 | 11/2012 | Lyon |
| 2012/0330484 A1 | 12/2012 | Martin et al. |
| 2013/0002052 A1 | 1/2013 | Hunter et al. |
| 2013/0049498 A1 | 2/2013 | Boughtwood |
| 2013/0069462 A1 | 3/2013 | Calvert |
| 2013/0069467 A1 | 3/2013 | Smith et al. |
| 2013/0093265 A1 | 4/2013 | Hunter et al. |
| 2013/0134839 A1 | 5/2013 | Boughtwood |
| 2013/0153311 A1 | 6/2013 | Huntzinger |
| 2013/0200746 A1 | 8/2013 | Foulsham et al. |
| 2013/0218436 A1 | 8/2013 | Kirby |
| 2013/0313930 A1 | 11/2013 | Fuchs |
| 2014/0008964 A1 | 1/2014 | Zanfei et al. |
| 2014/0048345 A1 | 2/2014 | Trueman |
| 2014/0058606 A1 | 2/2014 | Hilton |
| 2014/0117806 A1 | 5/2014 | Jaganjac |
| 2014/0132102 A1 | 5/2014 | Peng et al. |
| 2014/0159628 A1 | 6/2014 | Brooking |
| 2014/0203624 A1 | 7/2014 | Hilton et al. |
| 2014/0217837 A1 | 8/2014 | Jaganjac |
| 2014/0265738 A1 | 9/2014 | Anderson et al. |
| 2014/0265970 A1 | 9/2014 | Burke |
| 2014/0285041 A1 | 9/2014 | Lankin et al. |
| 2014/0326525 A1 | 11/2014 | Doerkse |
| 2014/0340013 A1 | 11/2014 | Li et al. |
| 2015/0129327 A1 | 5/2015 | Yoshino et al. |
| 2015/0144410 A1 | 5/2015 | Fraser |
| 2015/0185288 A1 | 7/2015 | Burke |
| 2015/0228411 A1 | 8/2015 | Owen |
| 2015/0229194 A1 | 8/2015 | Sromin |
| 2015/0249371 A1 | 9/2015 | Owen |
| 2015/0270756 A1 | 9/2015 | Foulsham et al. |
| 2015/0288230 A1 | 10/2015 | Foulsham et al. |
| 2015/0303857 A1 | 10/2015 | Burke |
| 2016/0011003 A1 | 1/2016 | Biderman et al. |
| 2016/0049894 A1 | 2/2016 | Burke et al. |
| 2016/0068056 A1 | 3/2016 | Burtov et al. |
| 2016/0111987 A1 | 4/2016 | Hunter et al. |
| 2016/0149525 A1 | 5/2016 | Owen |
| 2016/0156253 A1 | 6/2016 | Owen |
| 2016/0172939 A1 | 6/2016 | Owen |
| 2016/0226346 A1 | 8/2016 | Roberts |
| 2016/0276884 A1 | 9/2016 | Roberts |
| 2016/0325801 A1 | 11/2016 | Artemev |
| 2016/0329795 A1 | 11/2016 | Ricci et al. |
| 2016/0344246 A1 | 11/2016 | Fraser et al. |
| 2016/0380523 A1 | 12/2016 | Hunter et al. |
| 2017/0008594 A1 | 1/2017 | Artemev |
| 2017/0133891 A1 | 5/2017 | Klassen |
| 2017/0305681 A1 | 10/2017 | Kramble et al. |
| 2017/0324307 A1 | 11/2017 | Roberts et al. |

(56) References Cited

U.S. PATENT DOCUMENTS

| | | |
|---|---|---|
| 2017/0327207 A1 | 11/2017 | Sierra |
| 2017/0353063 A1 | 12/2017 | Bell et al. |
| 2017/0361900 A1 | 12/2017 | Doerkse et al. |
| 2018/0013323 A1 | 1/2018 | Woolmer et al. |
| 2018/0019636 A1 | 1/2018 | Roberts |
| 2018/0056767 A1* | 3/2018 | Dolgov .................. B60G 3/145 |
| 2018/0072125 A1 | 3/2018 | Hunter et al. |
| 2018/0076701 A1 | 3/2018 | Hunter et al. |
| 2018/0152085 A1 | 5/2018 | Broadbridge |
| 2018/0154761 A1 | 6/2018 | Artemev |
| 2018/0226188 A1 | 8/2018 | Hunter et al. |
| 2018/0272892 A1 | 9/2018 | Monkhouse et al. |
| 2018/0342917 A1 | 11/2018 | Hunter et al. |
| 2019/0001990 A1 | 1/2019 | Lucas et al. |
| 2019/0020230 A1 | 1/2019 | Roberts |
| 2019/0074736 A1 | 3/2019 | Carlson et al. |

FOREIGN PATENT DOCUMENTS

| | | |
|---|---|---|
| CN | 1461195 A | 12/2003 |
| CN | 1747079 A | 3/2006 |
| CN | 1976211 A | 6/2007 |
| CN | 101275857 A | 10/2008 |
| CN | 101388589 A | 3/2009 |
| CN | 101883912 A | 11/2010 |
| CN | 102187556 A | 9/2011 |
| CN | 103231959 A | 8/2013 |
| DE | 1017273 B | 10/1957 |
| DE | 4311973 A1 | 2/1997 |
| DE | 10007658 A1 | 10/2001 |
| DE | 10161227 A1 | 7/2003 |
| DE | 102011004348 A1 | 8/2012 |
| EP | 0435461 A2 | 7/1991 |
| EP | 0616412 A1 | 9/1994 |
| EP | 1098429 A2 | 5/2001 |
| EP | 1587135 A1 | 10/2005 |
| EP | 1607251 A1 | 12/2005 |
| EP | 1848014 A1 | 10/2007 |
| EP | 1935679 A1 | 6/2008 |
| EP | 2803865 A1 | 11/2014 |
| FR | 2917709 A1 | 12/2008 |
| GB | 1051591 A | 2/1966 |
| GB | 2065983 A | 7/1981 |
| GB | 2344223 A | 5/2000 |
| JP | S5686048 A | 7/1981 |
| JP | H0253273 B2 | 11/1990 |
| JP | H04175530 A | 6/1992 |
| JP | H084550 A | 1/1996 |
| JP | 2000152558 A | 5/2000 |
| JP | 2003116260 A | 4/2003 |
| JP | 2003116261 A | 4/2003 |
| JP | 2004153898 A | 5/2004 |
| JP | 2004175530 A | 6/2004 |
| JP | 2004364392 A | 12/2004 |
| JP | 2005294830 A | 10/2005 |
| JP | 2006000480 A | 1/2006 |
| JP | 2006050853 A | 2/2006 |
| JP | 2008114745 A | 5/2008 |
| JP | 2009038869 A | 2/2009 |
| JP | 2010154688 A | 7/2010 |
| JP | 2010241183 A | 10/2010 |
| JP | 2011024379 A | 2/2011 |
| JP | 2011078151 A | 4/2011 |
| JP | 2011178151 A | 9/2011 |
| JP | 2011216575 A | 10/2011 |
| WO | 0038939 A1 | 7/2000 |
| WO | 02095912 A1 | 11/2002 |
| WO | 2008010669 A1 | 1/2008 |
| WO | 2009041185 A1 | 4/2009 |
| WO | 2010136049 A1 | 12/2010 |
| WO | 2011057051 A1 | 5/2011 |
| WO | 2011057052 A1 | 5/2011 |
| WO | 2011057070 A2 | 5/2011 |
| WO | 2011057071 A1 | 5/2011 |
| WO | 2013112158 A1 | 8/2013 |
| WO | 2014/001355 A2 | 1/2014 |
| WO | 2014172401 A2 | 10/2014 |
| WO | 2015/155670 A1 | 10/2015 |
| WO | 2017123441 A1 | 7/2017 |

OTHER PUBLICATIONS

International Search Report and Written Opinion of the International Searching Authority for International Application No. PCT/US2017/051104, entitled "Axial Flux Motor," dated Nov. 30, 2017.
International Search Report and Written Opinion of the International Searching Authority for International Application No. PCT/US2017/051117, entitled "Guided Multi-Bar Linkage Electric Drive System," dated Nov. 29, 2017.
Hilton, "Wheel torque and speed in a vehicle with in-wheel motors." EE Publishers Sep. 14, 2017. Accessed https://www.ee.co.za/article/wheel-torque-speed-vehicles-wheel-motors.html. 8 pages.
Pd18 Datasheet. Protean Electric, May 2018. Accessed at https://www.proteanelectric.com/f/2018/05/Pd18-Datasheet-Master.pdf. 2 pages.
The Technology Next-Gen Axial Flux Machines. Magnax. Accessed at https://www.magnax.com/technology on May 29, 2019. 11 pages.
YASA P400 R Series and Product Sheet. YASA. Accessed at https://www.yasa.com/yasa-p400/ on May 29, 2019. 7 pages.
Ahmed et al., "An optimal design of coreless direct-drive axial flux permanent magnet generator for wind turbine." Journal of Physics: Conference Series. vol. 439. No. 1. IOP Publishing, 2013. 17 pages.
Ashari et al., "Design and Implementation of Axial Flux Induction Motor Single Stator-Single Rotor for Electric Vehicle Application." IPTEK Journal of Proceedings Series 1.1 (2015). 6 pages.
Barakat, Design of Permanent Magnet Axial Flux High Power Wind Turbines Generators (MW range). ATCx Paris Nov. 9, 2017. 30 pages.
Bicek et al., "Mechanical failure mode causes of in-wheel motors." Strojniški vestnik—Journal of Mechanical Engineering 61.1 (2015): 74-85.
Boldea et al., The Induction Machine Handbook. CRC Press 2002. 946 pages.
Camilleri et al., "Thermal limitations in air-cooled axial flux in-wheel motors for urban mobility vehicles: A preliminary analysis." 2012 Electrical Systems for Aircraft, Railway and Ship Propulsion. IEEE, 2012. 8 pages.
Chanpeng et al., "Design of efficient in-wheel motor for electric vehicles." Energy Procedia 56 (2014): 525-531.
Electric Motors Design with Flux®. Application Sheet Altair HyperWorks. Dec. 2016. Accessed at altairhyperworks.com/Flux. 2 pages.
Fitzgerald et al., Electric machinery. vol. 5. New York: McGraw-Hill, 2003. 703 pages.
Gieras et al., Axial flux permanent magnet brushless machines. Springer Science & Business Media, 2008. 364 pages.
Hey et al., "Transient thermal modelling of an Axial Flux Permanent Magnet (AFPM) machine with model parameter optimisation using a Monte Carlo method." (2011). 11 pages.
Itoh et al., "In-wheel motor system." NTN technical Review 79 (2011). 7 pages.
Kahourzade et al., "Design optimization and analysis of AFPM synchronous machine incorporating power density, thermal analysis, and back-EMF THD." Progress in Electromagnetics Research 136 (2013): 327-367.
Kasgen et al., "Product development & testing requirements for electric wheel hub motors." Fraunhofer Systemforschung Elektromobilität (2011). 10 pages.
Kim et al., "Integrated design of in-wheel motor system on rear wheels for small electric vehicle." World Electric Vehicle Journal 4.3 (2010): 597-602.
Kirtley, 6.685 Electric Machines Class Notes. Massachusetts Institute of Technology Department of Electrical Engineering and Computer Science 2003. 219 pages.
Kirtley, Traction Motor Design Considerations. A concept paper in response to the FOA #DE-FOA-0000472 entitled Rare Earth Alternatives in Critical Technologies for Energy (REACT). May 2011. 11 pages.

(56) References Cited

OTHER PUBLICATIONS

Lamperth et al., Axial Flux Motor Technology—Ideal Topology for hybrid powertrain integration. EVS28 International Electric Vehicle Symposium and Exhibition 2015. 8 pages.
Lazari et al., Design optimization of traction motors for EV applications. CEDRAT News Jun. 2014. 2 pages.
Lejerskog et al., "Detailed study of closed stator slots for a direct-driven synchronous permanent magnet linear wave energy converter." Machines 2.1 (2014): 73-86.
Libert et al., "Investigation on pole-slot combinations for permanent-magnet machines with concentrated windings." Proc. ICEM. 2004. 6 pages.
Lombard, Analysis of thermal stress on motors. Thermal analysis Altair. Magnetics Technology International 2017. 2 pages.
Long, A high power density, high efficiency axial flux Halbach array motor/generator. Electric Aircraft Symposium Apr. 2010. 22 pages.
Lovatt et al., "Design procedure for low cost, low mass, direct drive, in-wheel motor drivetrains for electric and hybrid vehicles." IECON 2011—37th Annual Conference of the IEEE Industrial Electronics Society. IEEE, 2011. 5 pages.
Luo et al., "Study on the dynamics of the in-wheel motor system." IEEE transactions on vehicular technology 61.8 (2012): 3510-3518.
Mirimani et al., "Study the influence of air-gap variation on axial forces in axial flux permanent magnet motor using 3d-fem." University of Cassino and Southern Latium (2012). 9 pages.
Parviainen, "Design of axial-flux permanent-magnet low-speed machines and performance comparison between radial-flux and axial-flux machines." (2005). 155 pages.
Patterson et al., "A comparison of radial and axial flux structures in electrical machines." 2009 IEEE International Electric Machines and Drives Conference. IEEE, 2009. 7 pages.
Perez, Cogging torque computation and mesh for non-radial electrical motors in Flux®. Flux News Jun. 2014. 2 pages.
Rahman et al., "Application of direct-drive wheel motor for fuel cell electric and hybrid electric vehicle propulsion system." IEEE Transactions on Industry Applications 42.5 (2006): 1185-1192.
Staunton, PM Motor Parametric Design Analyses for a Hybrid Electric Vehicle Traction Drive Application—Interim Report. Oak Ridge National Laboratory Engineering Science and Technology Division. Jul. 2004. 110 pages.
Tong et al., "Vertical vibration analysis on electric vehicle with suspended in-wheel motor drives." 2013 World Electric Vehicle Symposium and Exhibition (EVS27). IEEE, 2013. 9 pages.
Vadaszffy, Power Play. Electric and Hybrid Vehicle Technology International Jul. 2015. 11 pages.
Watts et al., "The technology and economics of in-wheel motors." SAE International Journal of Passenger Cars—Electronic and Electrical Systems 3.2010-01-2307 (2010): 37-55.
Woolmer et al., "Analysis of the yokeless and segmented armature machine." 2007 IEEE International Electric Machines & Drives Conference. vol. 1. IEEE, 2007. 7 pages.
Yang et al., "Optimal design of an axial-flux permanent-magnet motor for an electric vehicle based on driving scenarios." Energies 9.4 (2016): 285. 18 pages.
Restriction Requirement for U.S. Appl. No. 15/701,885, entitled "Guided Multi-Bar Linkage Electric Drive System", 6 pages, dated May 4, 2018.
Non-Final Office Action for U.S. Appl. No. 15/701,885, entitled "Guided Multi-Bar Linkage Electric Drive System", 16 pages, dated Jul. 20, 2018.
Aspen Systems, Inc., "Preliminary Design of Linear Alternator Dynamometer for Free Piston Stirling Engines: Final Report." for the U.S. Department of Energy, National Technical Information Service, U.S. Department of Commerce, Springfield, VA, Jun. 1985, 162 pages.
Corrected Notice of Allowance, U.S. Appl. No. 12/590,493, dated Dec. 5, 2013.
European Search Report issued on EP12807528, dated Oct. 16 2015 (7 pages).
Final Office Action for U.S. Appl. No. 14/144,929, dated Apr. 20, 2017.
Final Office Action for U.S. Appl. No. 14/144,929, dated Feb. 19, 2016
Final Office Action issued by the U.S. Patent and Trademark Office in U.S. Appl. No. 12/590,496 dated Jul. 19, 2012 (26 pgs.).
Final Office Action, U.S. Appl. No. 12/590,493, dated Mar. 27, 2013.
Frost & Sullivan, "Overview of Electric Vehicles Market and Opportunities for Supply of Electric Motors," 13 pages (Jul. 26, 2009).
International Preliminary Report on Patentability for International Application No. PCT/US2010/055582, titled: "Electric Coil and Method of and Manufacture," dated May 15, 2012, 9 pages.
International Search Report and Written Opinion in International Patent Application No. PCT/US14/22951 dated Aug. 18, 2015, 13 pages.
International Search Report and Written Opinion in International Patent Application No. PCT/US2014/034262 dated Oct. 20, 2015, 24 pages.
International Search Report and Written Opinion in International Patent Application No. PCT/US2015/025240 dated Aug. 31, 2015, 10 pages.
International Search Report and Written Opinion in International Patent Application No. PCT/US2015/026068 dated Jul. 13, 2015, 10 pages.
International Search Report and Written Opinion in PCT/US2018/031773 dated Aug. 28, 2018. 12 pages.
International Search Report and Written Opinion in PCT/US2018/044955 dated Oct. 5, 2018. 16 pages.
International Search Report and Written Opinion issued by the European Patent Office as International Searching Authority for International Application No. PCT/US10/55581 dated Feb. 22, 2011 (10 pgs.).
International Search Report and Written Opinion issued by the European Patent Office as International Searching Authority for International Application No. PCT/US10/55582 dated Feb. 21, 2011 (11 pgs.).
International Search Report and Written Opinion issued by the European Patent Office as International Searching Authority for International Application No. PCT/US10/55616 dated May 27, 2011 (17 pgs.).
International Search Report and Written Opinion issued by the European Patent Office as International Searching Authority for International Application No. PCT/US10/55619 dated Jan. 31, 2011 (7 pgs.).
International Search Report and Written Opinion issued by the European Patent Office as the International Searching Authority in corresponding International Application No. PCT/US12/51131, dated Sep. 4, 2013 (14 pgs.).
International Search Report and Written Opinion issued in International Application PCT/US12/44684, dated Sep. 19, 2012, 7 pages.
Zapworld, ZAPPY3 Takes Scooters to the Next Dimension. Retrieved from http://www.zapworld.com/node/93. Jun. 2, 2004 (1 pg.).
Muetze, et al. Performance Evaluation of Electric Bicycles, Fourth IAS Annual Meeting, Conference Record of the 2005. Retrieved on Jul. 8, 2009 from: http://www.ieeexplore.ieee.org. pp. 2865-2872.
Non-Final Office Action for U.S. Appl. No. 14/144,929, dated Aug. 11, 2016.
Non-Final Office Action for U.S. Appl. No. 14/144,929, dated Jul. 23, 2015.
Notice of Allowance for U.S. Appl. No. 14/144,929, dated Dec. 7, 2017.
Notice of Allowance issued by the U.S. Patent and Trademark Office in U.S. Appl. No. 12/590,496 dated Sep. 26, 2012 (9 pgs.).
Notice of Allowance, U.S. Appl. No. 12/590,493, dated Sep. 4, 2013.
Office Action issued by the U.S. Patent and Trademark Office in U.S. Appl. No. 12/590,493 dated Mar. 27, 2012 (32 pgs.).
Office Action issued by the U.S. Patent and Trademark Office in U.S. Appl. No. 12/590,496 dated Jan. 18, 2012 (34 pgs.).
U.S. Office Action dated May 2, 2012 for U.S. Appl. No. 12/590,495.

(56) References Cited

OTHER PUBLICATIONS

International Search Report and Written Opinion in International Patent Application No. PCT/US2019/037438 dated Sep. 9, 2019, 11 pages.

* cited by examiner

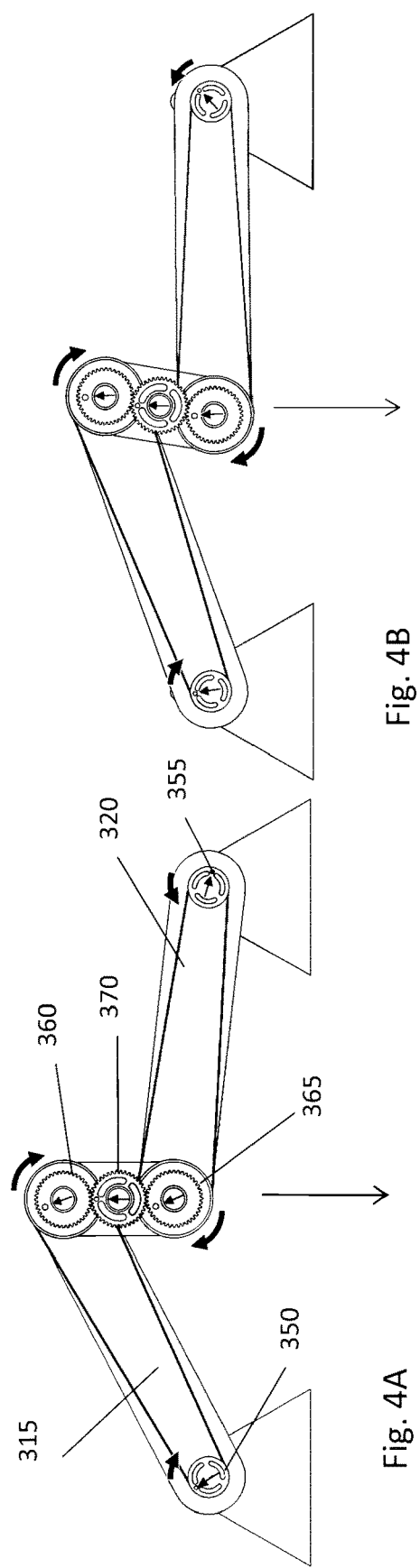

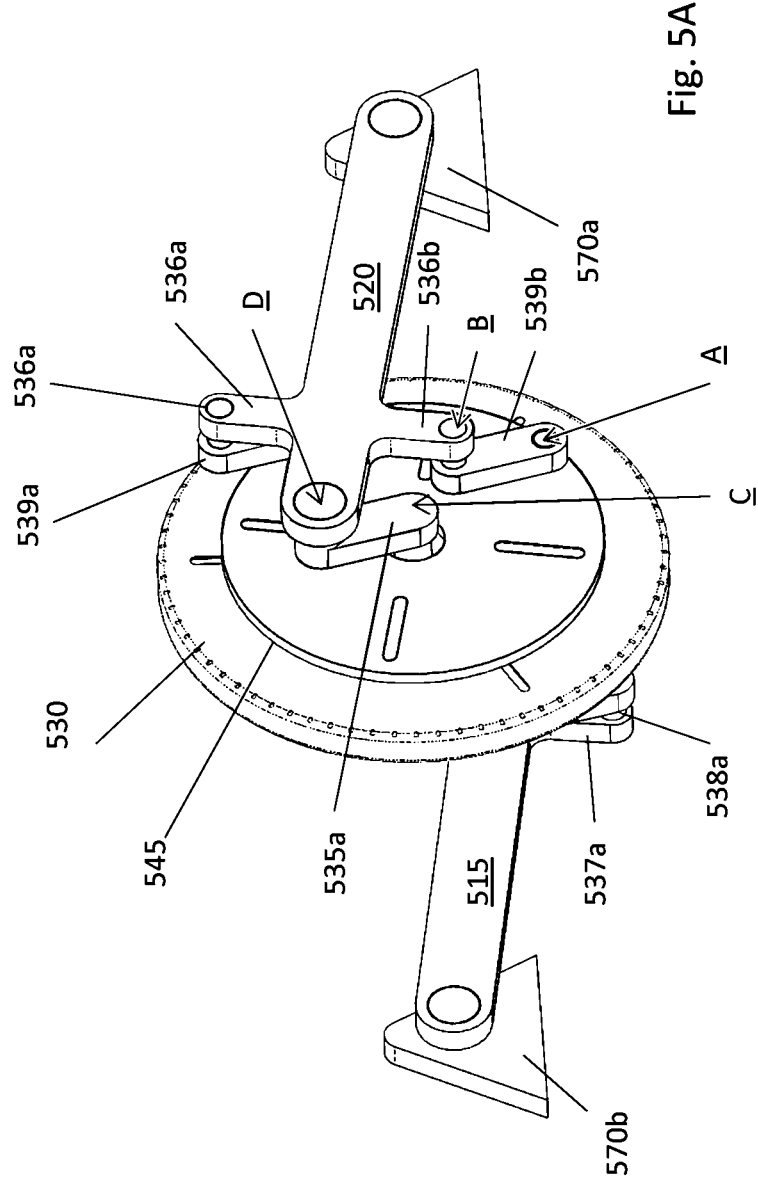

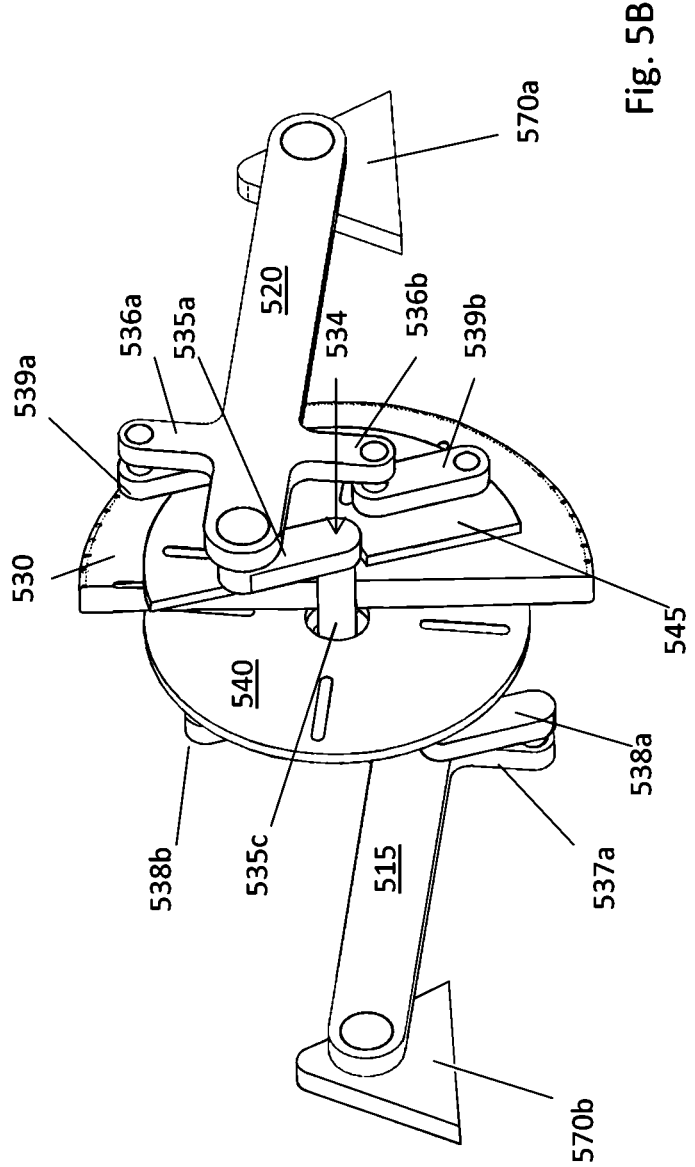

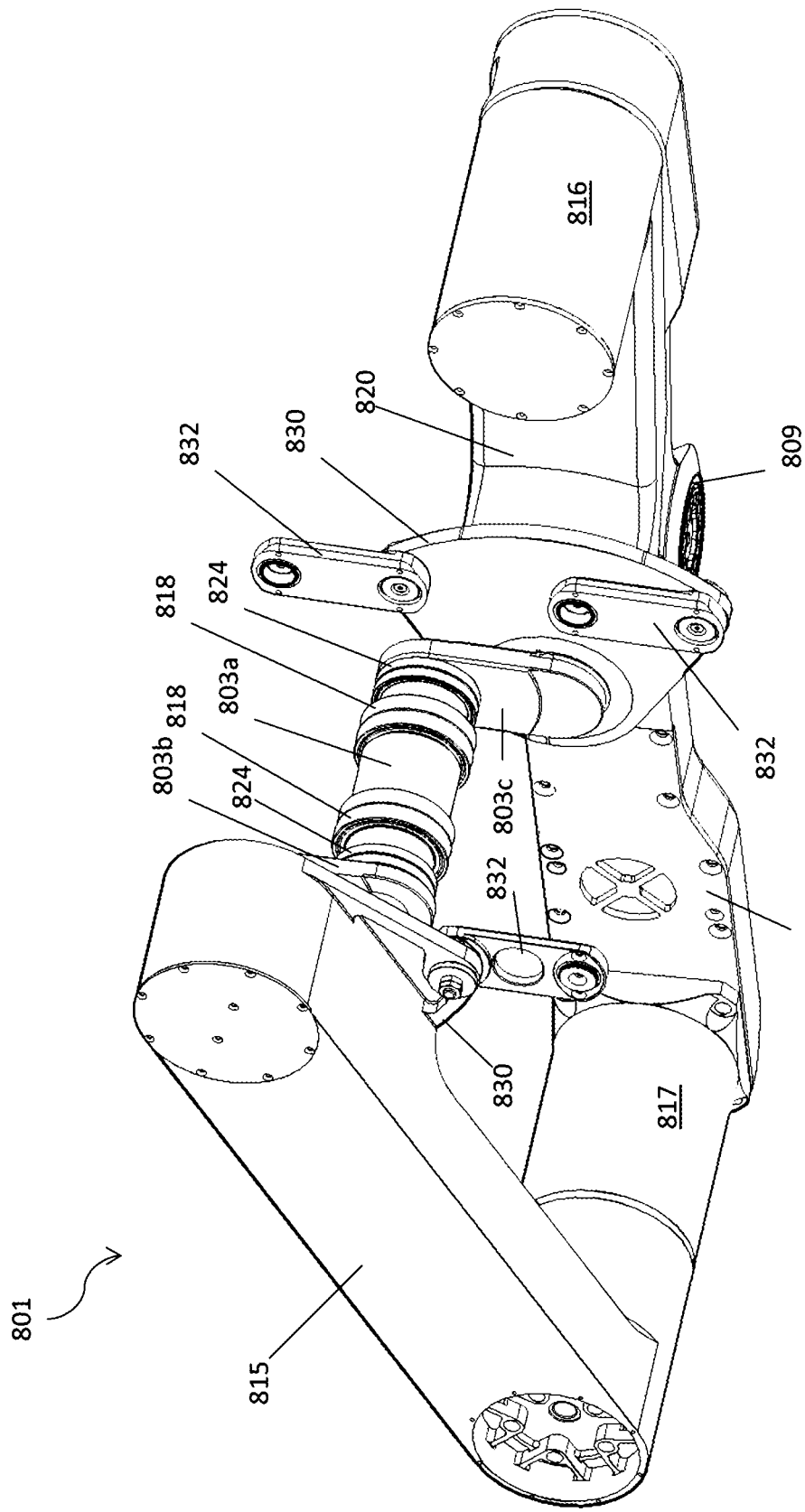

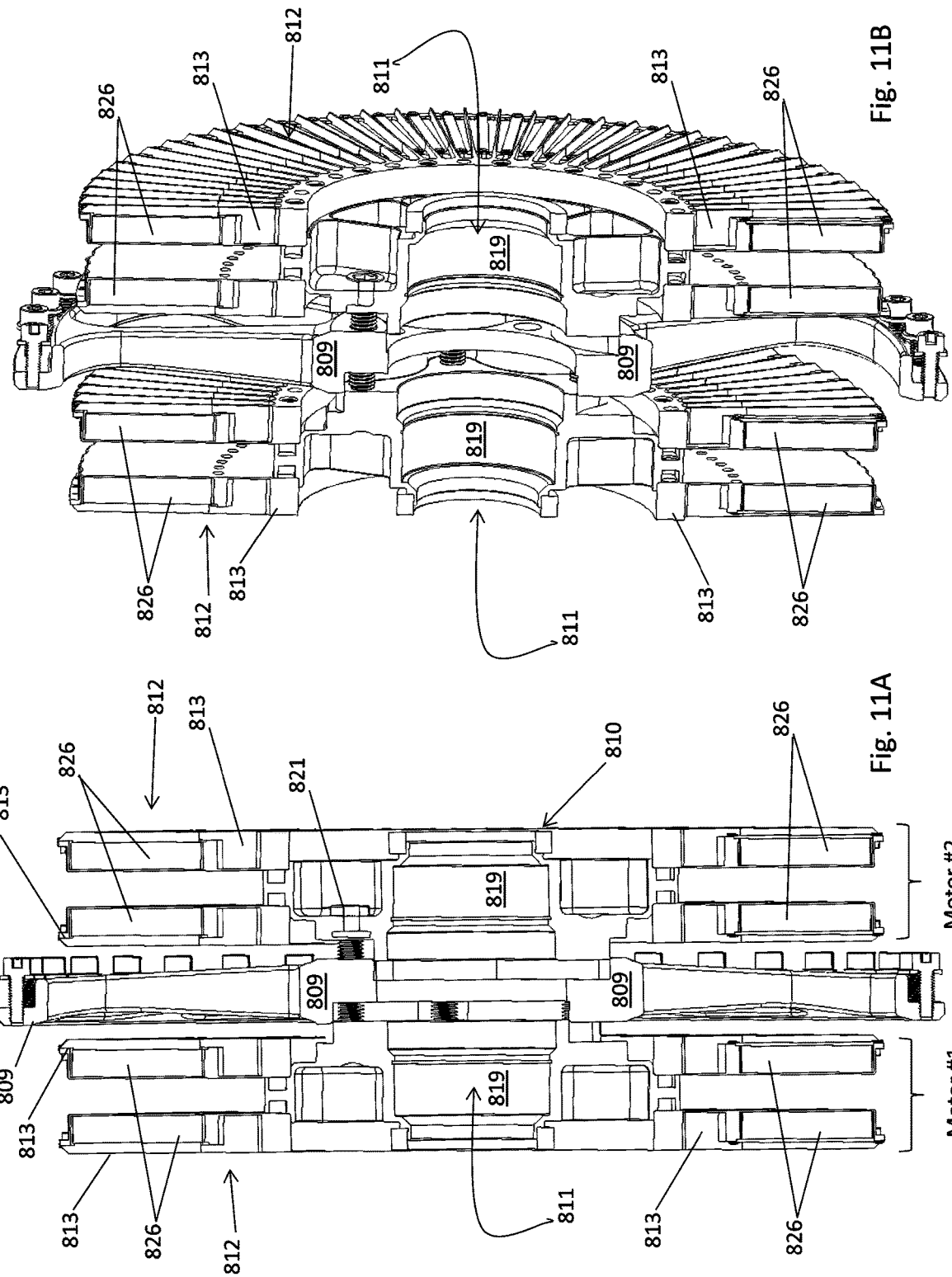

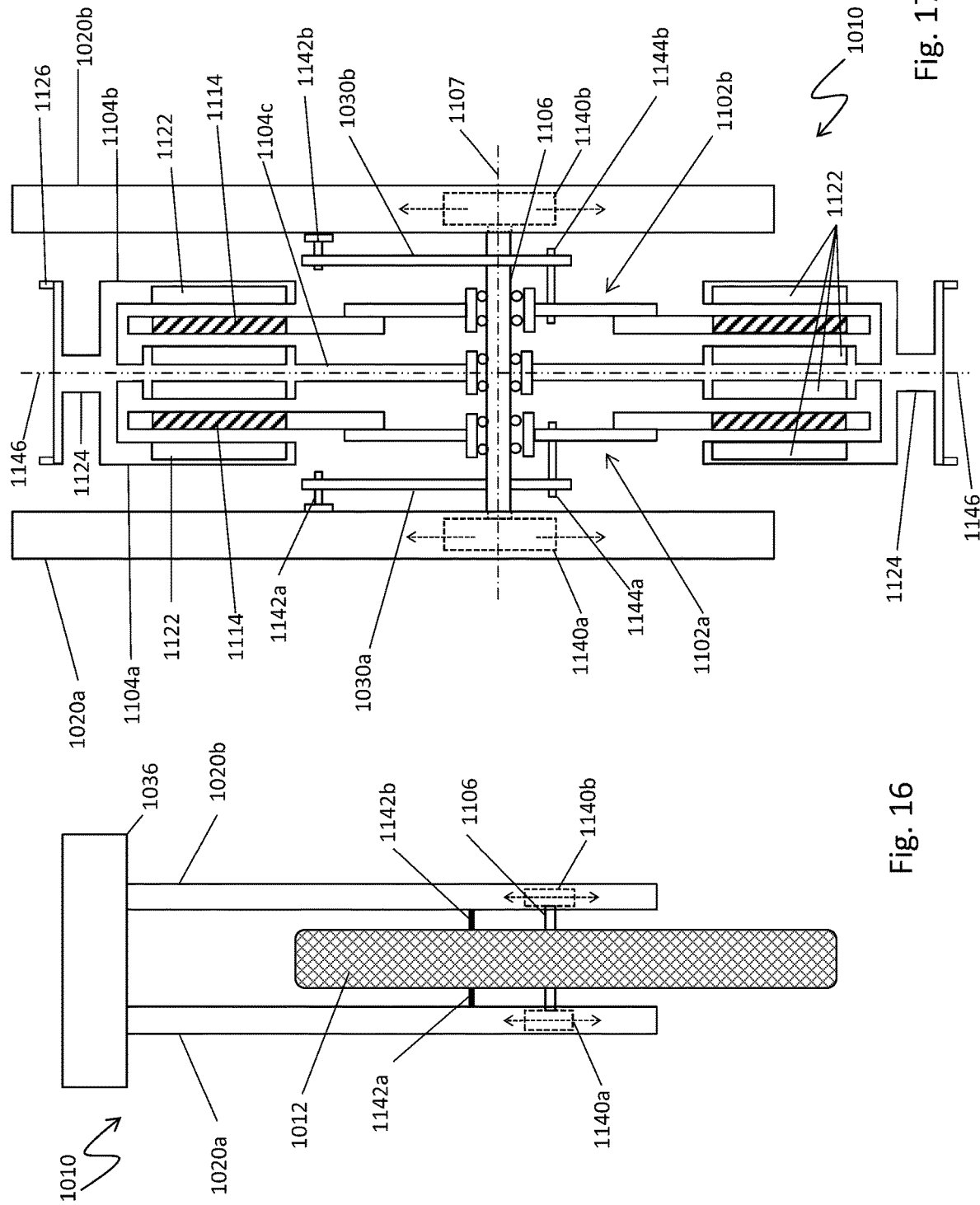

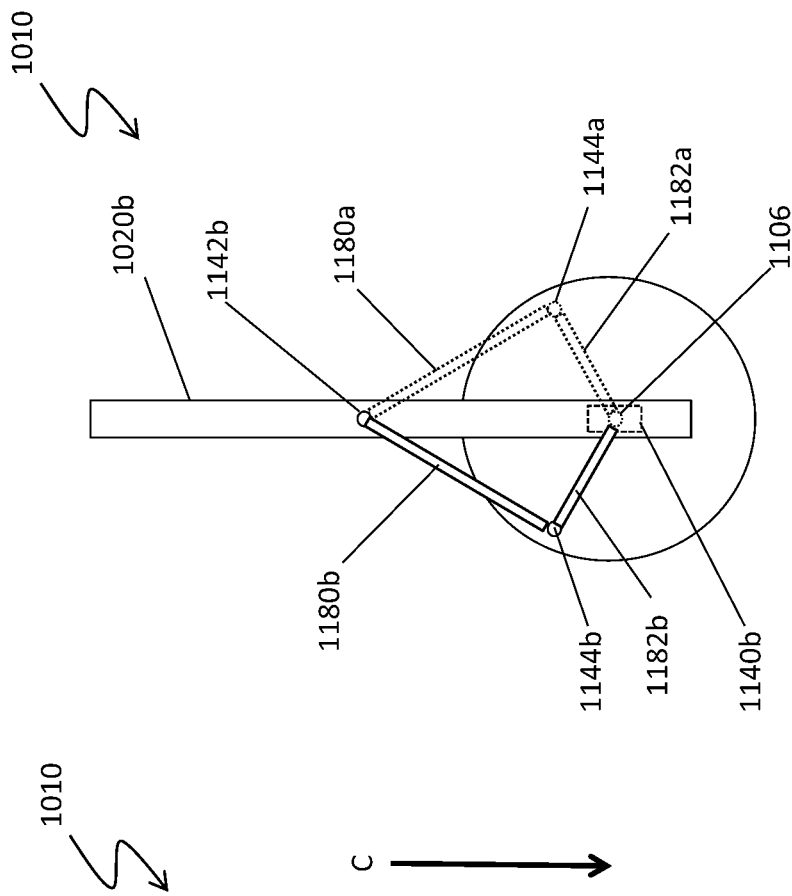
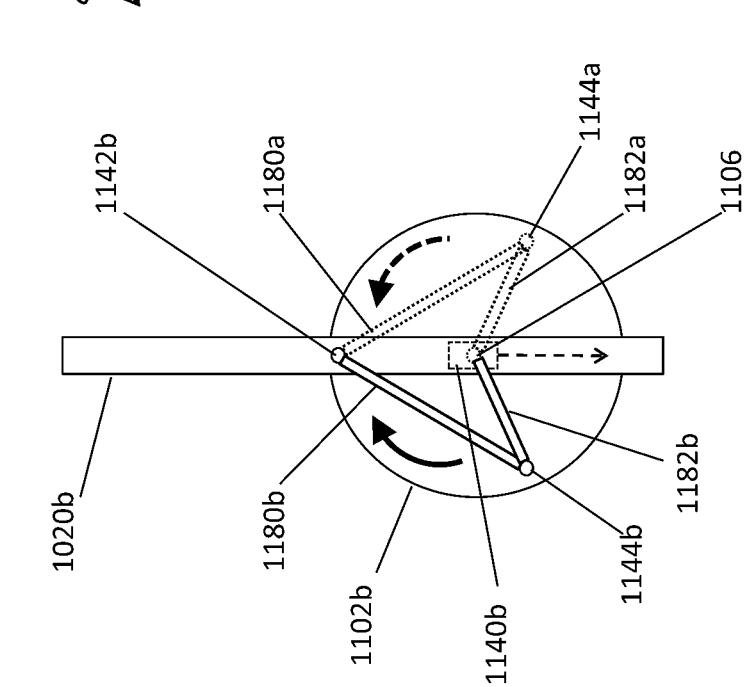
Fig. 20A
Fig. 20B

MULTI-BAR LINKAGE ELECTRIC DRIVE SYSTEM

RELATED APPLICATIONS

This application claims the benefit of U.S. Provisional Application No. 62/393,982, filed on Sep. 13, 2016, and U.S. Provisional Application No. 62/512,469, filed on May 30, 2017. The entire teachings of the above applications are incorporated herein by reference.

TECHNICAL FIELD

Embodiments generally relate to an electric motor drive assembly and more specifically to an electric motor drive assembly that is capable of producing movement of a wheel that has two-degrees of freedom, e.g., rotational movement of the wheel and translational movement of the wheel in a direction that is transverse to the rotational axis of the wheel.

BACKGROUND

A growing number of companies are developing vehicles that use electric motors as the means for propelling the vehicles. And because electric motors can be designed to be very compact and efficient, especially as compared to combustion engines, they are also being used as in-wheel or hub motors, with an electric motor mounted in or very close to each of the wheels of the vehicle. Some of the newer, more innovative designs for vehicle drive systems are not only capable of rotating the wheel but are also capable of moving the wheel in directions that are transverse to the rotational axis. That is, they are capable of producing movement with two degrees of freedom, namely, rotation to propel the vehicle along the road and translation to provide an active suspension for the vehicle.

One example of such a system is described in U.S. Pat. No. 8,519,575 and is based on the use of Lorentz-force, linear actuators. To achieve the two degrees of freedom, it uses two opposed linear actuators and a linear-to-rotary converter that is made up of an arrangement of cam followers interfacing with a cam assembly that supports a wheel rim. The linear actuators are opposed to each other in that they lie on opposite sides of the rotational axis of the wheel. When the two opposed linear actuators are operated to move the cam followers towards each other or away from each other in synchronization, the linear-to-rotary converter converts that movement to pure rotation of the wheel. When the two linear actuators are operated to move the cam followers in the same direction (i.e., one moving towards the rotational axis and the other away), this causes the cam assembly and the wheel to which it is attached to translate in a direction that is transverse to the axis of rotation of the wheel.

SUMMARY

In general, in one aspect, an example embodiment of the invention features an electric drive system including a rotary motor system and a multi-bar linkage mechanism. The rotary system includes a hub assembly, a first rotating assembly, a second rotating assembly, and a third rotating assembly, wherein the hub assembly defines a rotational axis and wherein each of the first rotating assembly, the second rotating assembly, and the third rotating assembly is coaxially aligned with the rotational axis and is capable of rotational movement about the rotational axis independent of the other two. The multi-bar linkage mechanism is connected to each of the first and third rotating assemblies and connected to the hub assembly and constrains movement of the hub assembly so that the rotational axis of the hub assembly moves along a defined path that is in a transverse direction relative to the rotational axis. The multi-bar linkage mechanism causes the rotational axis of the hub assembly to translate along the defined path in response to relative rotation of the first rotating assembly and the third rotating assembly with respect to each other.

In general, in another aspect, an example embodiment of the invention features an electric drive system including a rotary motor system and a multi-bar linkage system. The rotary motor system includes a hub assembly, a magnetic rotor assembly, a first coil stator assembly, and a second coil stator assembly, wherein the hub assembly defines a rotational axis, and wherein each of the magnetic rotor assembly, the first coil stator assembly, and the second coil stator assembly is coaxially aligned with the rotational axis and is capable of rotational movement about the rotational axis independent of each other. The multi-bar linkage mechanism is connected to each of the first and second coil stator assemblies and is connected to the hub assembly. The multi-bar linkage mechanism constrains movement of the hub assembly so that the rotational axis of the hub assembly moves along a defined path that is in a transverse direction relative to the rotational axis and it causes the rotational axis of the hub assembly to translate along the defined path in response to relative rotation of the first coil stator assembly and second coil stator assembly with respect to each other.

Other embodiments may include one or more of the following features. The multi-bar linkage mechanism is a four-bar linkage mechanism, e.g., a Watt's linkage mechanism. The multi-bar linkage mechanism includes a support structure, a crankshaft assembly, a first swing arm, and a second swing arm, wherein the first swing arm has a first end rotatably connected to the crankshaft assembly and a second end rotatably connected to the support structure at a first location on the support structure, and wherein the second swing arm has a first end rotatably connected to the crankshaft assembly and a second end rotatably connected to the support structure at a second location on the support structure that is different from the first location on the support structure. The crankshaft assembly includes the hub assembly. The crankshaft assembly includes a crankshaft, a first crank arm extending in a first radial direction away from the crankshaft, and a second crank arm extending in a second radial direction away from the crankshaft. The first crank arm and the second crank arm are located at opposite ends of the crankshaft. The first radial direction is opposite to the second radial direction.

Still other embodiments may include one or more of the following features. The electric drive system further includes a first torque link connecting the first coil stator assembly to the first swing arm and a second torque link connecting the second coil stator assembly to the second swing arm. And it includes a wheel rim circumscribing the rotational axis and wherein the magnetic rotor assembly is coupled to the wheel rim so that the wheel rim rotates about the rotational axis along with the magnetic rotor assembly. The wheel rim also circumscribes the rotary motor system. The rotary motor system includes: a first electric motor including a first magnetic rotor, the first coil stator assembly, a rotor bearing assembly enabling the first magnetic rotor to rotate about the rotational axis, and a first coil bearing assembly enabling the first coil stator assembly to rotate about the rotational axis independent of the first magnetic rotor; and a second electric motor including a second magnetic rotor, the second coil stator assembly, and a second coil bearing assembly enabling the second coil stator assembly to rotate about the rotational axis independent of the first magnetic rotor and independent of the first coil stator assembly, wherein the magnetic rotor assembly comprises the first and second magnetic rotors coupled to each other to rotate together about the rotational axis. The first and second electric motors are axial flux motors.

In general, in still another aspect, an example embodiment of the invention features a vehicle including a chassis, and a plurality of wheel assemblies. At least one of the wheel assemblies includes a rotary motor system including a hub assembly, a magnetic rotor assembly, a first coil stator assembly, and a second coil stator assembly, wherein the hub assembly defines a rotational axis and wherein each of the magnetic rotor assembly, the first coil stator assembly, and the second coil stator assembly is coaxially aligned with the rotational axis and is capable of rotational movement about the rotational axis independent of each other. And it includes a multi-bar linkage mechanism connected to each of the first and second coil stator assemblies and connected to the hub assembly. The multi-bar linkage mechanism constrains movement of the hub assembly so that the rotational axis of the hub assembly moves along a defined path that is in a transverse direction relative to the rotational axis and it causes the rotational axis of the hub assembly to translate along the defined path in response to relative rotation of the first coil stator assembly and second coil stator assembly with respect to each other. The wheel assembly also includes a wheel rim circumscribing the rotational axis and wherein the magnetic rotor assembly is coupled to the wheel rim so that the wheel rim rotates about the rotational axis along with the magnetic rotor assembly.

Other embodiments of the wheel assembly may include one or more of the following features. The multi-bar linkage mechanism is a four-bar linkage mechanism, e.g., a Watt's linkage mechanism. The multi-bar linkage mechanism includes a support structure, a crankshaft assembly, a first swing arm, and a second swing arm, wherein the first swing arm has a first end rotatably connected to the crankshaft assembly and a second end rotatably connected to the support structure at a first location on the support structure, and wherein the second swing arm has a first end rotatably connected to the crankshaft assembly and a second end rotatably connected to the support structure at a second location on the support structure that is different from the first location on the support structure. The crankshaft assembly includes the hub assembly. The crankshaft assembly includes a crankshaft, a first crank arm extending in a first radial direction away from the crankshaft, and a second crank arm extending in a second radial direction away from the crankshaft. The first crank arm and the second crank arm are located at opposite ends of the crankshaft. The first radial direction is opposite to the second radial direction. The at least one wheel assembly also includes a first torque link connecting the first coil stator assembly to the first swing arm and a second torque link connecting the second coil stator assembly to the second swing arm. The rotary motor system includes: a first electric motor including a first magnetic rotor, the first coil stator assembly, a rotor bearing assembly enabling the first magnetic rotor to rotate about the rotational axis, and a first coil bearing assembly enabling the first coil stator assembly to rotate about the rotational axis independent of the first magnetic rotor. And the rotary motor system includes a second electric motor including a second magnetic rotor, the second coil stator assembly, and a second coil bearing assembly enabling the second coil stator assembly to rotate about the rotational axis independent of the first magnetic rotor and independent of the first coil stator assembly, wherein the magnetic rotor assembly includes the first and second magnetic rotors coupled to each other to rotate together about the rotational axis.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 4A-4D is a sequence of schematic diagrams illustrating translational movement of components of the Watt's linkage drive system of FIG. 3.

FIG. 5A shows in schematic form another embodiment of the multi-bar linkage drive system.

FIG. 5B shows the multi-bar linkage drive system of FIG. 5A with the sections of the rotor and one of the stators removed to make the other stator visible.

FIG. 10 is a perspective view of the multi-bar linkage structure that is used in the multi-bar linkage drive system of FIG. 8.

FIGS. 11A and 11B are orthogonal and perspective cross-sectional views of the two-motor axial flux drive that is used in the multi-bar linkage drive system shown in FIG. 8, with the coil stator assemblies removed.

FIG. 16 is a front view of a schematic representation of the axial flux motor employed in the integrated wheel and suspension assembly of FIG. 14.

FIG. 17 is a cross-sectional view of a schematic representation of the integrated wheel and suspension assembly of FIG. 14.

FIGS. 20A and 20B presents the arrangement illustrated by FIGS. 18A and 18B in terms of interconnected linkages.

DETAILED DESCRIPTION

A description of example embodiments follows.

Figure 1:
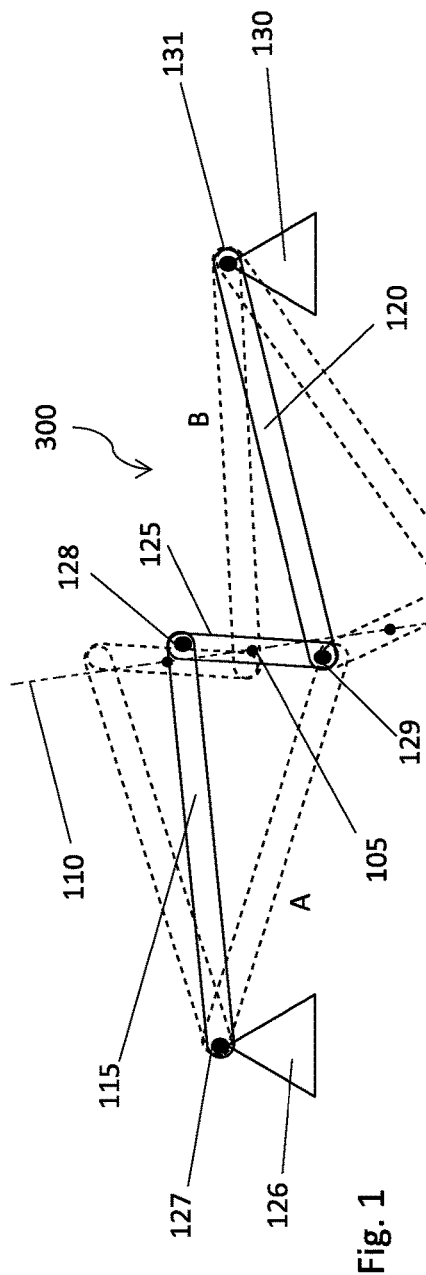
FIG. 1 is a schematic diagram illustrating a Watt's linkage.

FIG. 1 is a schematic diagram illustrating a Watt's linkage 100. A Watt's linkage is a mechanical linkage arrangement in which a central point 105 of one of the linkages is constrained, by virtue of the linkages, to travel along a pre-defined path, a significant portion of which is substantially-straight, as indicated by line 110. A Watt's linkage includes three movable rods, in this particular example, two longer rods 115 and 120 of equal length connected together by a shorter rod 125, the mid-point of which is point 105. The ends of the three rods are hinged so that they can rotate about the hinge point. On end of rod 115 is connected to stationary mount 126 at hinge point 127 and the other end of rod 115 is connected to one end of shorter rod 125 at hinge point 128. One end of rod 120 is connected to another end of shorter rod 125 at hinge point 129 and the other end of rod 120 is connected to a second stationary mount 130 at another hinge point 131. The stationary mounts 126 and 130 are fixed in place relative to each other by, for example, being coupled to a common base or common structure. Though there are only three movable rods in this example, the Watt's linkage is also generally referred to as a four-bar linkage because of the fact that the connection between the two stationary mounts is considered to be the fourth bar.

Figure 2:
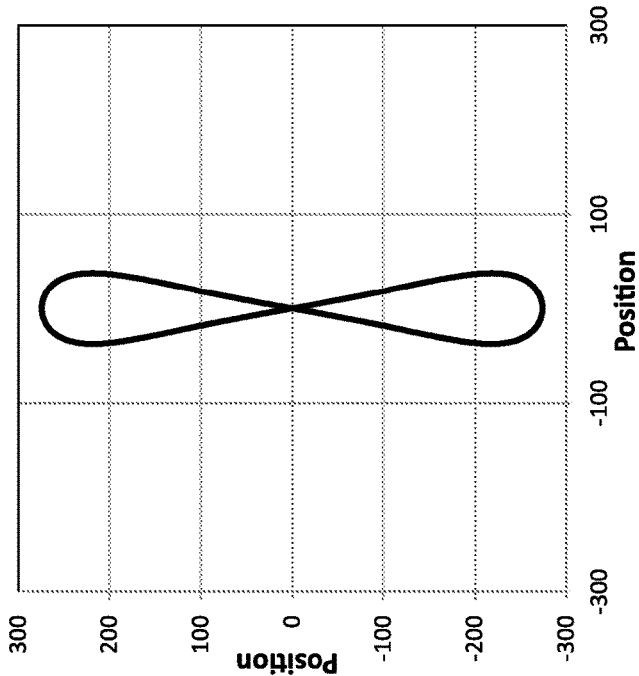
FIG. 2 is a graph illustrating an example translational path of the center point of the Watt's linkage of FIG. 1.

As should be apparent from FIG. 1, even though the end points of the rods are constrained by virtue of being connected to each other, the orientation of the rods can be changed. So, for example, assume the initial position of the rods is as shown by the elements depicted with solid lines. As rod 115 is rotated counterclockwise relative to hinge point 127 to another position, indicated in the figure by the dashed lines labeled A, that will cause rod 120 to rotate about its hinge point 131 in a clockwise direction and will cause short rod 125 to rotate relative to its center point in a clockwise direction. Alternatively, if rod 115 is rotated in a clockwise direction to another position, indicated in the figure by the dashed lines labeled B, that will cause rod 120 to rotate in a counterclockwise direction and will cause short rod 125 to also rotate relative to its center point in a counter clockwise direction. A characteristic of the Watt's linkage is that as the orientation of the rods are changed in this manner to cover all possible orientations that are permitted by the linkage arrangement, the center point 105 of the short rod 125 will trace out a defined path and the Watt's linkage arrangement will constrain that center point to always lie on that defined path. As illustrated by FIG. 2, the shape of that defined path is a figure eight of which significant portion is substantially linear.

Figure 3:
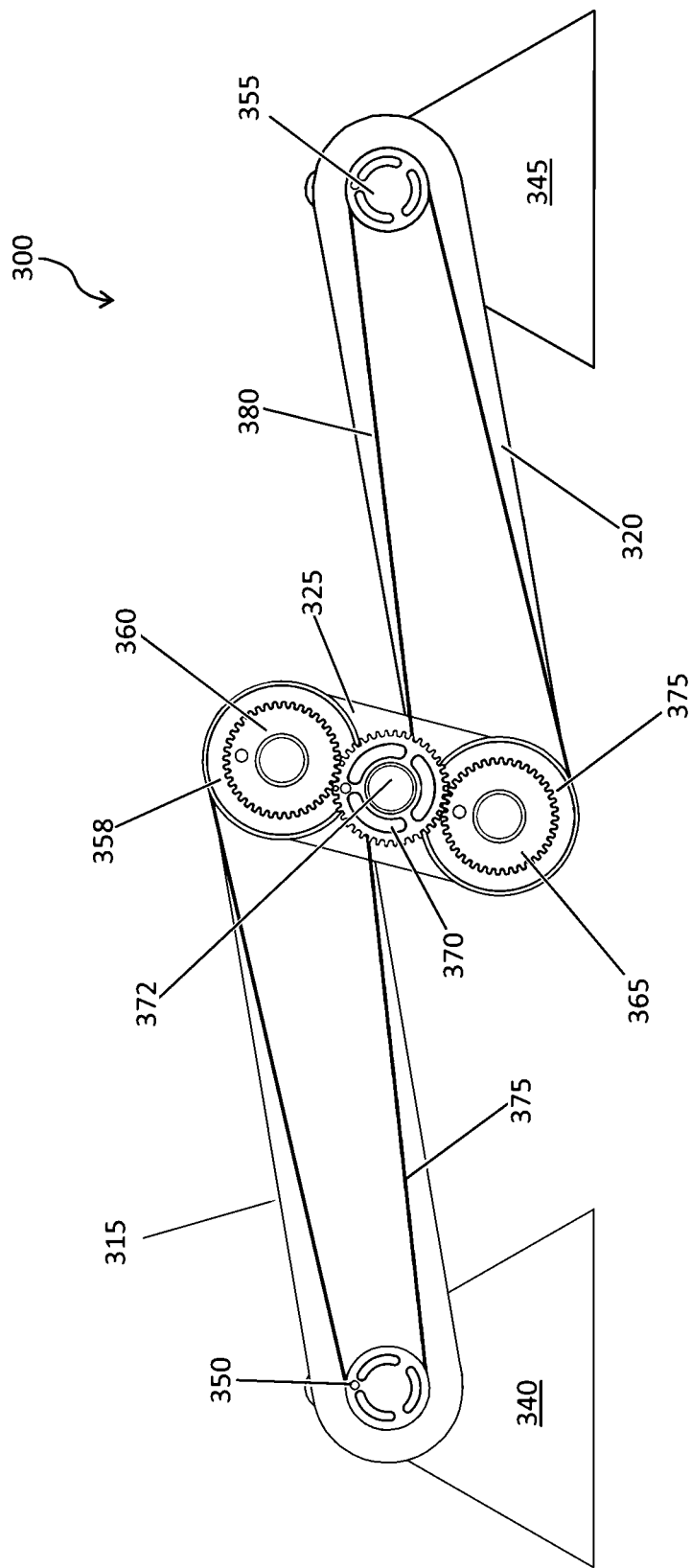
FIG. 3 is a schematic representation of one embodiment of a Watt's linkage drive system.

An embodiment illustrated by FIG. 3 uses the Watt's linkage in combination with two electric motors to construct a drive system 300 that is capable of both driving a wheel (not shown) rotationally and controllably translating the wheel in a direction that is transverse to the wheel's axis of rotation. In other words, it is a drive system that has two degrees of freedom.

The drive system 300 includes two electric motors 340 and 345 fixed in position relative to each other (illustrated by the two triangular-shaped objects). It also includes a linkage arrangement made up of two equal-length swing arms 315 and 320 and a shorter crank arm 325. These correspond, respectively, to the previously discussed rods 115, 120 and 125, shown in FIG. 1. There is a pulley 350 at one end of swing arm 315 that is driven by electric motor 340 and there is another pulley 355 at the far end of swing arm 320 that is driven by electric motor 345. At the other end of swing arm 315, opposite the end with pulley 350, there is a second pulley 358. Attached to that pulley 358 is a coaxially aligned elbow gear 360. Similarly, at the other end of swing arm 320, opposite the end with pulley 355, there is also a pulley 363 with another attached, coaxially aligned elbow gear 365, which is the same size as elbow gear 360 and 365. Located at the center point of crank arm 325 there is a crank gear 370 that is also the same size as and meshes with the two elbow gears 360 and 365. On swing arm 315, a drive belt 375 couples pulley 350 to pulley 358 and on swing arm 320, another drive belt 380 couples pulley 355 to pulley 363. Pulleys 350 and 358 have the same drive ratio as pulleys 355 and 363.

To understand how the linkage drive system 300 of FIG. 3 operates, consider a case in which the two motors 340 and 345 turn their attached pulleys 350 and 355 at the same rate and in the some direction (e.g., clockwise). In that case, belt 375 will also drive pulley 360 in a clockwise direction and at a speed that is determined by the ratio of the sizes of the two pulleys 350 and 358. Similarly, belt 380 will drive pulley 365 in a clockwise direction and at a speed that is determined by the ratio of the sizes of those two pulleys 355 and 363. Assuming both sets of pulleys (i.e., pulleys 350 and 358 and pulleys 355 and 363) have a ratio of 1:2, when motor 340 drives pulley 350 in a clockwise direction at a rotational speed of 2ω, then pulley 358 will turn in a clockwise direction at half that speed, namely, ω. Since the gears 360, 365, and 370 are of the same ratio, gear 370 and the drive shaft 373 to which it is attached will want to turn in a counterclockwise direction at a speed of ω. Similarly, when motor 345 drives pulley 355 in a clockwise direction at a rotational speed of 2ω, then pulley 363 will turn in a clockwise direction at half that speed, namely, ω and gear 370 and the drive shaft 373 to which it is attached will again want to turn in a counterclockwise direction at a speed of ω. Notice that this operating condition, namely, both motors operating at the same speed, results in both motors causing gear 370 to rotate at ω and this results in zero torque applied to the crank arm 325 which supports crank gear 370. That is, operating both motors 340 and 345 at the same speed and in the same direction will result in the drive system producing pure rotational movement of the drive shaft. Since no torque is being applied to any of the linkages, they will not change their orientations or positions. Thus, under those drive conditions, the swing arms 315 and 320 will remain stationary and "locked" in position.

It should be apparent from the above discussion that a different situation arises if the motors are operated at different speeds. In that case, a torque will be imposed on the crank arm and that torque will cause the orientation of linkages to change. To see why, consider what happens in the above situation when motor 345 increases its speed slightly above $2\omega$. When that happens, gear 365 will be forced to rotate at a speed that is greater than the speed at which crank gear 370 is rotating. The only way that can happen is if gear 365, besides rotating, also "walks" around crank gear 370. This will, in turn, result in a torque being applied to crank 325 causing the linkages to alter their orientation with respect to each other and causing the drive shaft to move along the defined path imposed by Watt's linkage. In other words, this will cause the drive shaft 372 to move or translate in a direction that is transverse to the axis of the drive shaft. In addition, as long as the speeds of the two motors are different, the linkages will continue to change orientation and the axis of drive shaft will continue to move along that predefined path.

Assuming the two motors are operating at the same speed to produce purely rotary movement of the drive shaft, changing the position of the drive shaft from one point to another point is accomplished by changing the phase relationship of the two motors. The speed at which that change in phase is accomplished determines the speed at which the drive shaft translates to its new location as determined by the Watt's linkage.

In the foregoing description, it was assumed for simplicity that the pulleys were the same size and that the gears were the same size and had the same ratios. This need not be the case. The pulley sizes can be different, as can the gear sizes. In any case, a key operating condition for achieving purely rotational movement is that both gear 365 and gear 360 rotate the crank gear 370 at the same speed. Then, any change in speed of one motor or the other will cause translational movement of the drive shaft 372. Stated differently, any shift in phase of either motor 340 or motor 345 will cause a corresponding translation movement of the drive shaft 372.

If the configuration shown in FIG. 3 is used as drive system for the wheels of a vehicle, the motors 340 and 345 would, for example, be attached to the frame or chassis of the vehicle and the wheel rim and tire would be attached to the drive shaft 372. Such an arrangement, because it is capable of two degrees of freedom, could be used to both propel the vehicle as well as actively control the height of the chassis above the road surface (which capability could serve to provide a active shock absorber function).

Another embodiment of the multi-bar linkage drive system combines the two motors of FIG. 3 into a single electric motor with a rotational axis located at the center of the crank. A schematic representation of this other embodiment of multi-bar linkage drive system 500 is shown in FIGS. 5A and 5B.

The drive system 500 includes two swing arms 515 and 520 and crank assembly 534 that connects between corresponding ends of the two swing arms 515 and 520. Crank assembly 534 includes a crankshaft 535c with two crank arms 535a and 535b, one at each end of the crankshaft 535c, each extending transversely with respect to the rotational axis of the crankshaft 535c and oriented 180° with respect to each other. One end of swing arm 520 pivotably connects to crank arm 535a through a bearing while the other end of swing arm 520 pivotably connects to a mount structure 570a through another bearing. Similarly, one end of swing arm 515 pivotably connects to crank arm 535b (not visible in the figures) through its own bearing while the other end of swing arm 515 pivotably connects to a mount structure 570b through yet another bearing. This combination of elements constitutes a four-bar linkage arrangement similar to that shown in FIG. 3 and it constrains the rotational axis of the crankshaft to follow a defined path as the orientations of the linkages changes.

The electric motor in drive system 500 includes two stator assemblies 540 and 545 and a rotor assembly 530, each of which is mounted on the crankshaft 535c using bearings so that it can rotate independently of the other two components. Rotor assembly 530 includes a ring of bolts 550 around its periphery for mounting a wheel rim and a tire (not shown) onto the rotor assembly 530.

Note that the bearings are not shown in FIGS. 5A and 5B so as to simplify the drawings. They are, however, explicitly shown in FIG. 7, which is discussed later. In addition, as will also be made clear in connection with FIG. 7, the motors in the described embodiment are electric, axial-flux motors, in which the stator assemblies are coil stator assemblies, and the rotor assembly is a magnetic rotor assembly. Also, note that the word "stator," which may sometimes be interpreted to imply that the component being referred to is stationary and does not rotate, is not meant to be so limited in the present context. The stator assemblies described herein are capable of rotating about a rotational axis, which may or may not be the same as the rotational axis of the rotor assembly. This capability is an important feature because, at least in some embodiments, it enables the drive system to produce two degrees of freedom, namely, rotation and translation.

Returning to FIGS. 5A and 5B, each swing arm 515 and 520 is mechanically connected to its corresponding stator assembly 530 and 540. Swing arm 520 has two wing extensions 536a and 536b. Torque links 539a and 539b connect wing extensions 536a and 536b, respectively, to stator assembly 545. Similarly, on the other side of the drive system, swing arm 515 also has two wing extensions 537a and 537b (not visible in the figures). And torque links 538a and 538b connect wing extensions 537a and 537b, respectively, to stator assembly 540. The torque links 539a and 539b are for transferring the torque generated by the stator assembly 545 to the swing arm 520, and the torque links 538a and 538b are for transferring a torque generated by the stator assembly 540 to the swing arm 515.

Though each the stator assembly 515 and 520 is free to rotate about the axis of the crankshaft 535c by virtue of being mounted on the crankshaft with bearings, the torque links connecting them to the multi-bar linkage constrain that motion, preventing them from freely rotating without limit. In fact, the torque links limit the rotation of the stator assemblies to within a narrow range of permitted rotations. This limitation range of rotation enables one to use a wire harness to connect the drive signals to the coils in the stator assemblies rather than having to use commutation or some other means to provide drive signals to the coils on the coil stator assembly.

Note that in FIG. 5A, there are four points labeled points A, B, C, and D. These points define four distances, namely: AB, AC, CD, and BD. AB represents the length of the torque link, CD represents the length of the crank arm, AC represents a radial distance between the axis of the crankshaft and the attachment point of the torque link to the stator assembly, and BD represents the distance between the point at which the crank arm connects to the swing arm and the point at which the torque link connects to the extension wing of the swing arm. In the described embodiment, these lengths are designed to have the following relationship to each other: AB=CD and AC=BD. This defines a parallelogram. As a consequence of this arrangement, a rotation of the stator assembly with respect to the vertical translates into a corresponding and equal rotation of the swing arm about its point of coupling to the mount structure and in the same direction. In other words, if stator assembly 545 rotates in a clockwise direction, this will urge swing arm 520 in an upward direction, which also corresponds to a rotation of swing arm 520 about the mounting structure 570*a* in a clockwise direction.

The multi-bar linkage drive system of FIGS. 5A and B works in a manner similar to the way the embodiment shown in FIG. 3 works. When a drive signal is applied to each of the stator assemblies 540 and 545 so that both drive signals produce the same torque and urge the rotor assembly 530 to rotate in a clockwise direction, then pure rotational motion of the rotor assembly 530 results. (Note: the direction of rotation is viewed from the perspective of one side of the motor, in this case, the side on which stator assembly 545 is located. This will be the convention used throughout the rest of the description.) The orientation of the swing arms 515 and 520 will remain fixed and the crankshaft 535*c* will not move in a transverse direction. This is because the torque imposed on the crankshaft 535*c* by the stator assembly 540 is counteracted by the torque imposed on the crankshaft 535*c* by the stator assembly 545. The torques on the linkages, being equal in magnitude and opposite in direction, produce no net torque on any of the linkages.

On the other hand, if the drive signal on one stator assembly is changed relative to the other drive signal, there will be a net torque on the crank assembly and that will cause it to change its orientation/position. As a result the crankshaft, while it is rotating, will also move along the path defined by the multi-bar linkage.

Figure 6C:
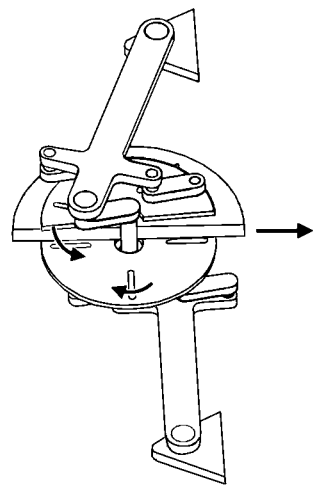
FIGS. 6A-6F is a sequence of schematic representations illustrating the translational movement of the multi-bar linkage drive system shown in FIGS. 5A and 5B.
Figure 6F:
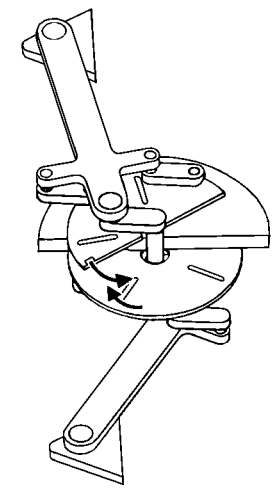
Figure 6B:
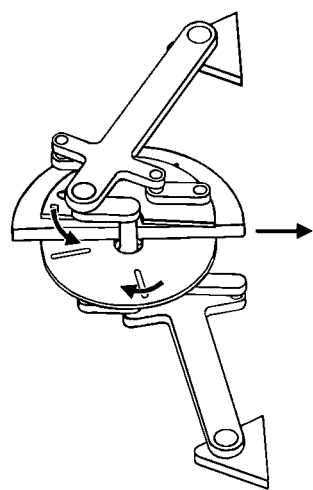
Figure 6E:
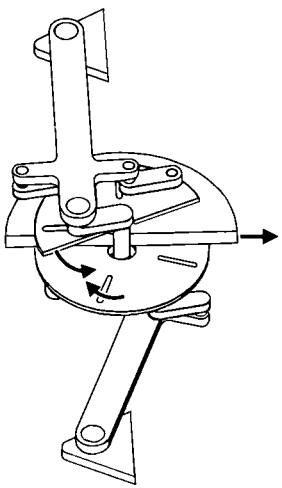
Figure 6A:
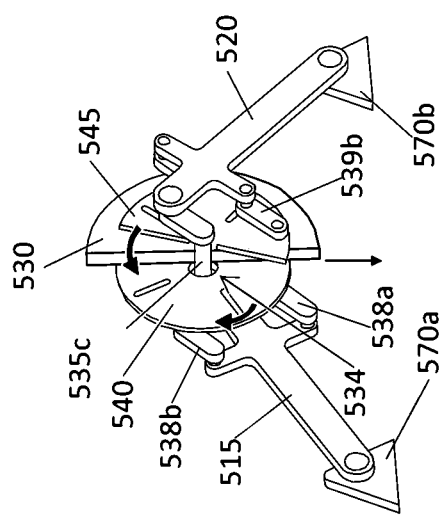
Figure 6D:
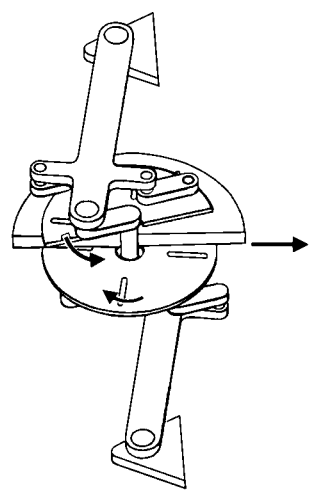

To understand how the multi-bar linkage drive system can be operated to translate the crankshaft consider the case in which the magnetic rotor assembly is prevented by something from rotating and the swing arms are moved. This can be visualized with the aid of FIGS. 6A through 6F which show the various relative positions of the drive system elements as the crankshaft 535*c* and the rotor assembly 530 (on which a wheel would be mounted) are moved (or translated) from an up position (FIG. 6A) to a down position (FIG. 6F). The downward pointing arrow in each of the figures indicates the direction in which the rotor assembly and crank assembly is being moved. As the rotor assembly 540 moves downward from the location depicted in FIG. 6A, the crank assembly and the swing arms 515 and 520 will follow it down. At the same time, the torque links 538 and 539 will cause the stator assemblies 540 and 545 to rotate in the same direction as the swing arm 515 and 420 are rotating about their respective mounts 570*a* and 570*b*. The downward movement of swing arm 520 represents a counterclockwise rotation about its mount 570*b*. So, stator assembly 545 will be forced to rotate in a counterclockwise direction about the crankshaft 535*c* by an equal amount. On the other side of the multi-bar linkage drive system, the downward movement of swing arm 515 represents a clockwise rotation about its mount 570*a*. So, stator assembly 540 will be forced to rotate in a clockwise direction about the crankshaft 535*c*.

As indicated by FIGS. 6C-F, this relative movement of the elements continues as the axis of the rotor assembly 530 is moved further down the path defined by the multi-bar linkage for the axis of the crankshaft 535*c*. Note that the stator assemblies 540 and 545 depicted in the drawings have reference slots which should be helpful in visualizing the rotation of these elements as the rotor assembly 530 is moved towards its down position indicated by FIG. 6F. Also note that there are arrows identifying the direction of rotation of the stator assemblies.

It should be apparent, that the movements that are depicted in FIGS. 6A-F can be produced by applying the appropriate drive signals to the stator assemblies 540 and 545. The drive signals need to be such that they apply a net torque on the rotor assembly 530 that is zero, resulting on no rotation of the rotor assembly 530, while at the same time urging the stator assemblies 540 and 545 to rotate in opposite directions of rotation relative to each other. For example, if stator 545 applies torque (via electromagnetic force on the rotor assembly 530) to turn itself counterclockwise (and in turn, urging the rotor assembly to rotate in a clockwise direction), it also exerts force on swing arm 520 via the torque links 539*a* and 539*b* that pushes up on the swing arm 520. There must then also be a balancing force at the crank assembly 534 that pushes down on the crank assembly 534 in a downward direction (because at small accelerations, the sum of forces is zero). The crank assembly 534, in turn, pushes down on the swing arm 520. As a consequence, the swing arm 520 has a force pushing it down where it connects to the crank assembly 534 and up where it connects to the torque links 539*a* and 539*b*. In effect, a rotating torque is applied to swing arm 520 causing the swing arm 520 to start to rotate in a counterclockwise direction, i.e., the same direction in which the stator assembly 545 is rotating. A similar action occurs on the other side of the rotor assembly 530 at stator assembly 540 and swing arm 515.

If both stator assemblies 540 and 545 are rotated in a way that rotates the corresponding swing arms 515 and 520 in an upward direction, then the swing arms 515 and 520 (and drive shaft 530) move up. If both stator assemblies 540 and 545 rotate the swing arms 515 and 520 in a downward direction, the swing arms 515 and 520 (and wheel 530) move down. If one swing arm is being rotated down while the other swing arm is being rotated up, and if the torques are balanced, the swing arms 515 and 520 do not move.

In summary, to rotate the wheel 530 without translation, equal torques are applied to both stator assemblies 540 and 545 in the same direction. In that case, the moments applied to each swing arm cancel and the rotor assembly rotates. To translate the wheel 530, equal but opposite torques are applied to both stator assemblies 540 and 45. This causes the swing arms 515 and 520 move in the same direction.

Since the multi-bar linkage drive system is a linear system both rotation of the rotor assembly 530 and translational movement of the crankshaft 535*c* (and rotor assembly 530) can be achieved by adding the signals that are required to produce each type of motion separately. In other words, through the use of appropriate drive signals, the rotor assembly can be made to rotate while at the same time it is also caused to translate up or down.

In the above discussions inertial effects are ignored. When inertial effects are added in, they change the magnitudes of the torques and forces needed but they do not change the general principles of how the multi-bar linkage drive system operates. In addition, in the above discussion it was explained that rotations occurs when the torques are equal with the same sign and motion (or translation) occurs when the torques are equal but of opposite signs. This is true at some but not all points along the defined path of translational movement (see FIG. 2). In general, at other locations, there is some small amount of "cross-talk" or "non-orthogonality."

Figure 7:
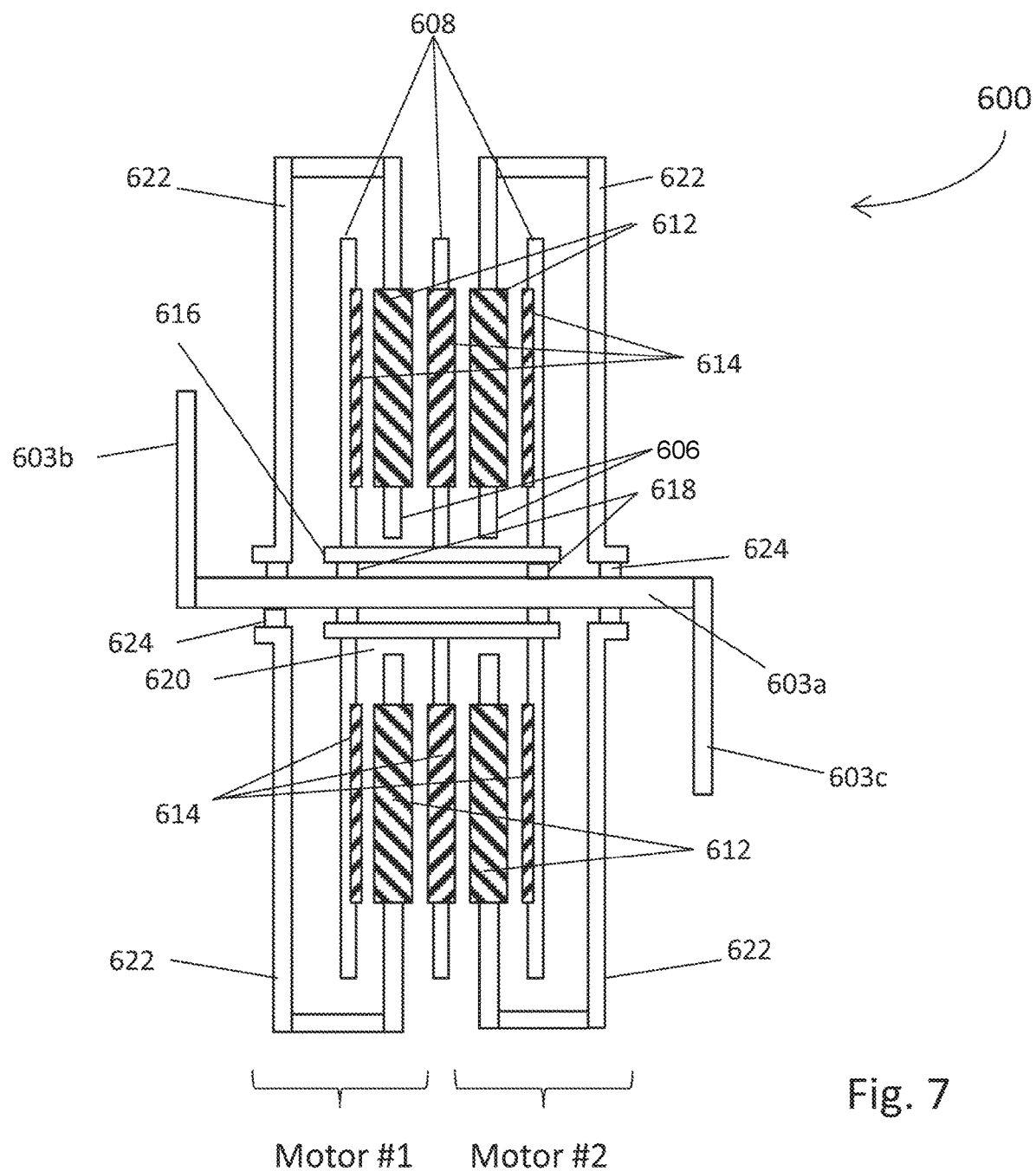
FIG. 7 shows the components of a two-motor axial flux drive such as might be used in the multi-bar linkage drive system shown in FIGS. 5A and 5B.
Figure 8:
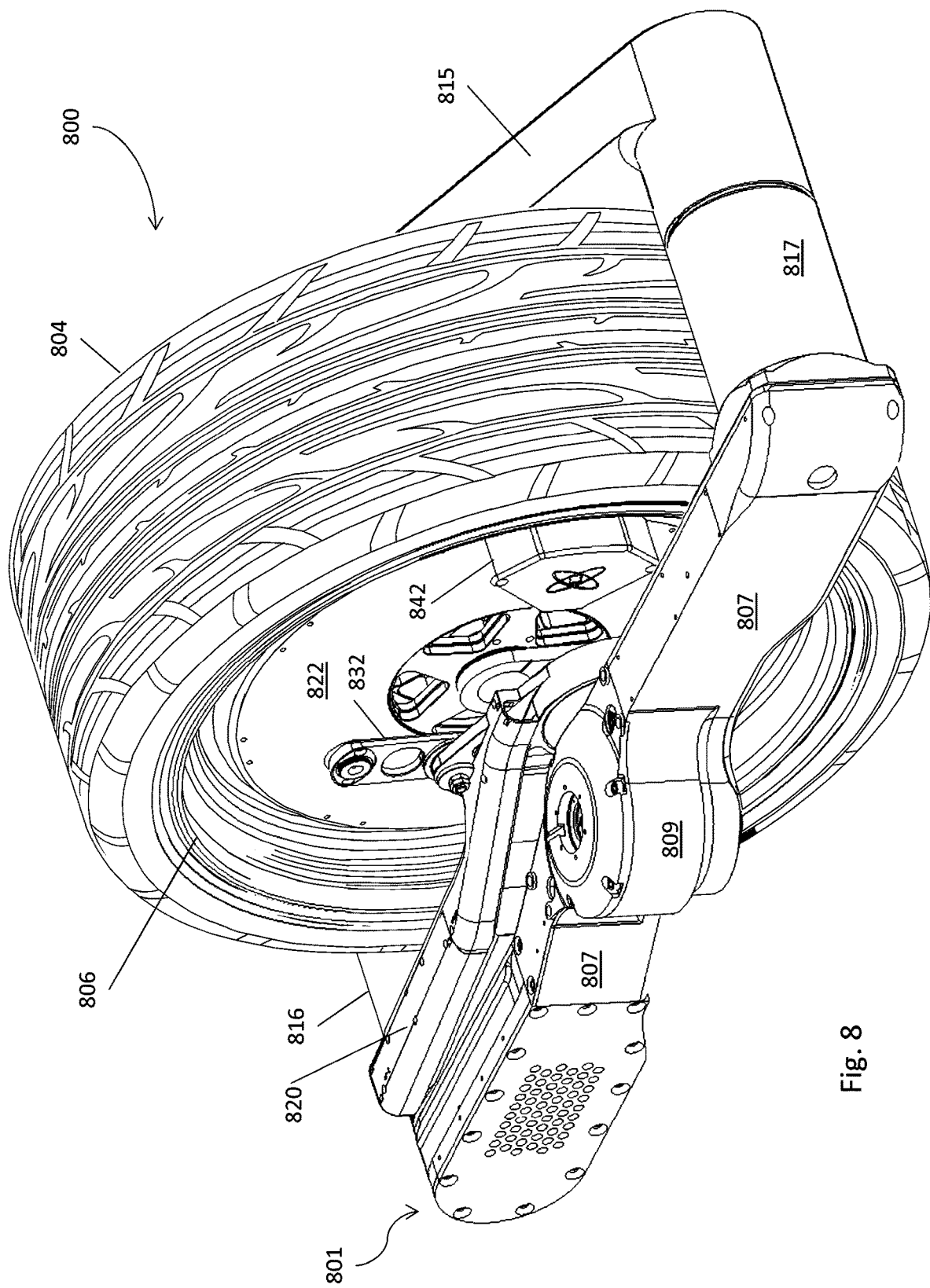
FIG. 8 is a perspective view of a multi-bar linkage drive system for use in a vehicle.
Figure 9:
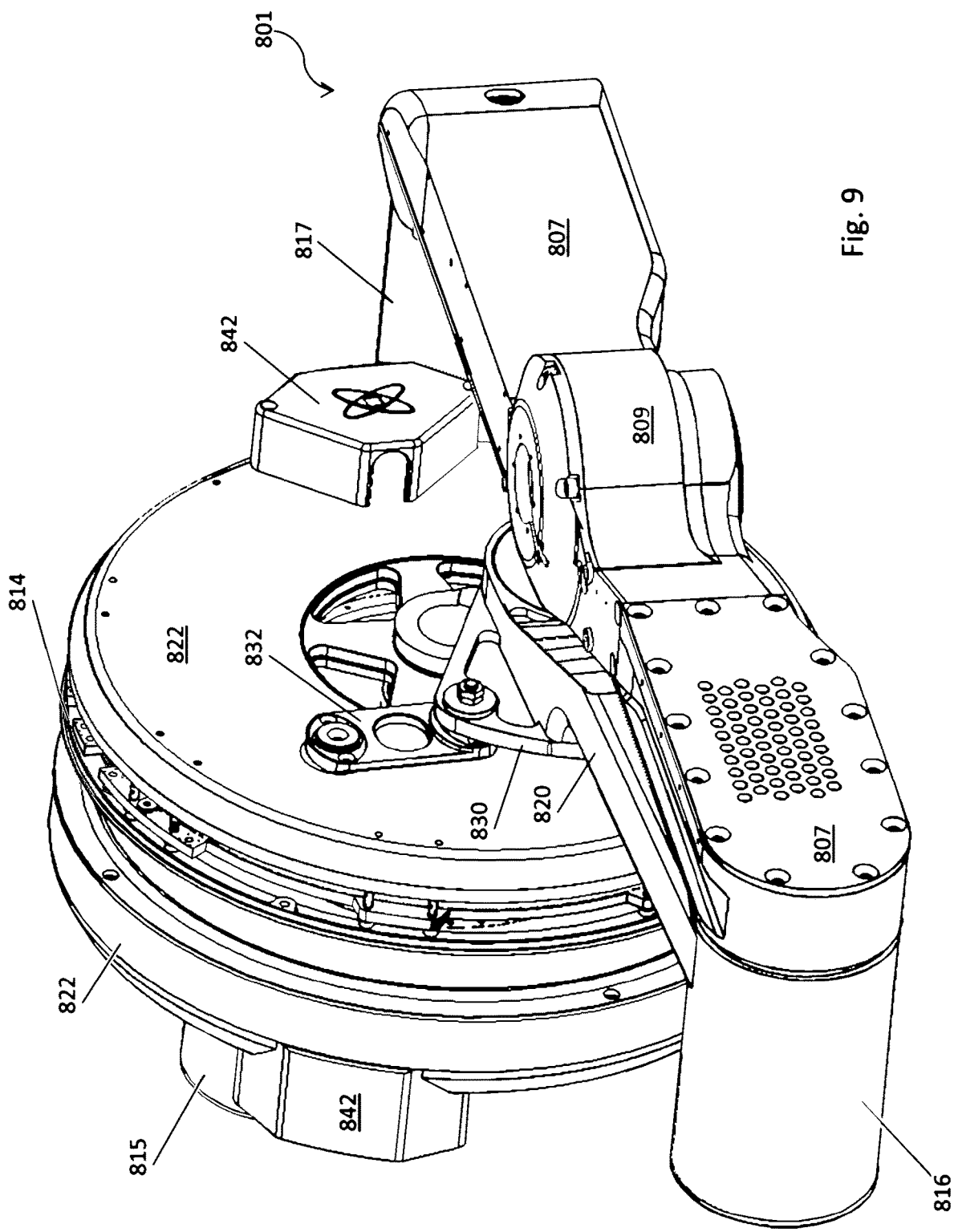
FIG. 9 is a perspective view of the multi-bar linkage drive system shown in FIG. 8, with some components removed to reveal internal structure.
Figure 12B:
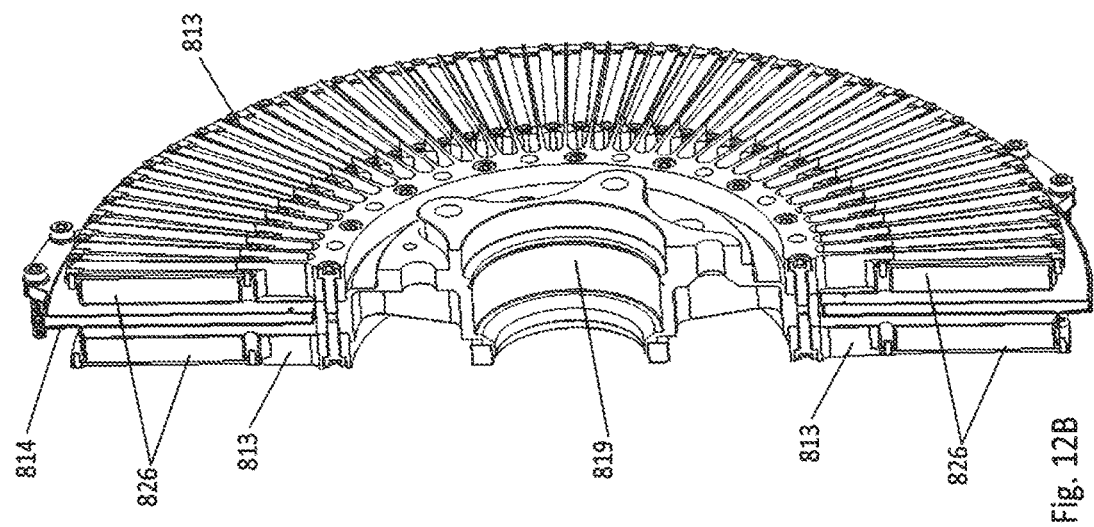
FIGS. 12A and 12B are orthogonal and perspective cross-sectional views of one of the axial flux motors shown in FIGS. 11A-B, with the coil stator assembly included.
Figure 12A:
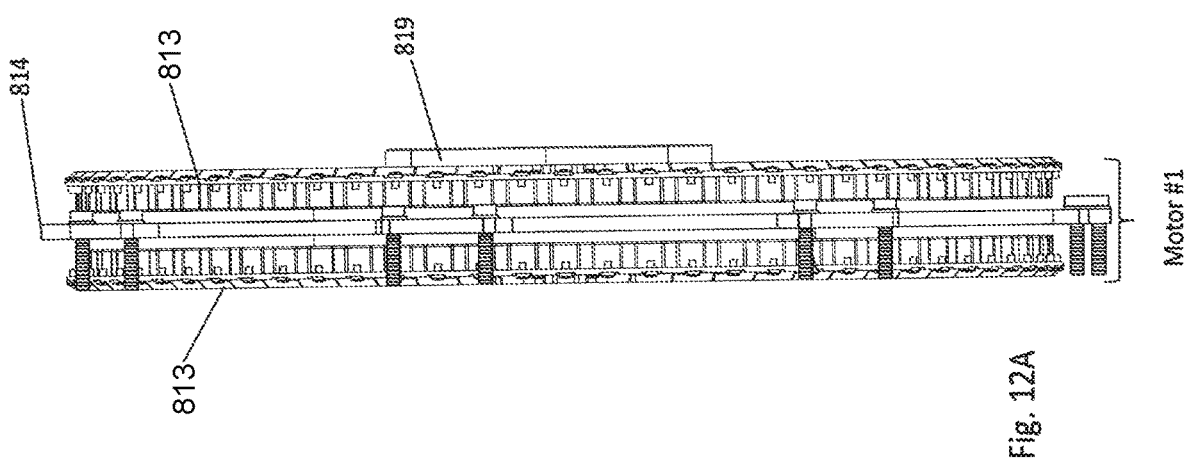

An example of the structure of an electric drive motor 600 that can be used in the previously described embodiment is shown in FIG. 7. It includes two, coaxially arranged axial flux motors that are coupled together along a common rotational axis. In this case, they are mounted on a crank assembly 602 which corresponds to the crank assembly 534 discussed in connection with the multi-bar linkage drive system depicted in FIG. 5. The crank assembly 602 includes a crankshaft 603a with crank arms 603b and 603c located at opposite ends of the crankshaft 603a and oriented 180° with respect to each other. In FIG. 7, the two motors are identified as Motor #1 and Motor #2.

In general, each of the axial flux motors has a coil stator assembly 606 sandwiched between two magnetic rotor assemblies 608. Each coil stator assembly 606 is a circular disk 610 that is rotatably mounted on the crankshaft 603a, with an array of coils 612 arranged around and within an annular region of the disk. Each of the magnetic rotor assemblies 608 is also a circular disk that is rotatably mounted on the crankshaft 603a. Mounted on each disk of each magnetic rotor assembly 608 is an array of radially-oriented bar-shaped permanent magnets 614 distributed about an annular region of the disk. The array of magnets 614 on the magnetic rotor assemblies 608 is aligned with the array of coils 612 on the coil stator assemblies 606.

The magnetic rotor assemblies 608 of the two coaxially aligned motors are rigidly affixed to a common hub assembly 616 that, in turn, rides on bearings 618 located between the hub assembly 616 and the crankshaft 603a. So, the multiple magnetic rotor assemblies 608 freely rotate together about the crankshaft 603a as one unit.

The disks of the coil stator assemblies 606 sandwiched between the magnetic rotor assemblies 608 have circularly-shaped central openings 620 through which the hub assembly 616 passes without making contact with the disks. So, the coil stator assemblies 606 and the hub assembly 616 can rotate independent of each other. Each coil stator assembly 606 is supported around its periphery by a housing 622 that is, in turn, rotatably mounted on and rides on the crankshaft 603a via a set of bearings 624. The bearings 624 permit the housings 622, as well as their supported coil stator assemblies 606, to also freely rotate on the crankshaft 603a just as the magnetic rotor assemblies 608 are able to do. Though the magnetic stator assemblies 608 all rotate as a unitary structure on the crankshaft 603a, each of the coil stator assemblies 606 rotates on the crankshaft 603a independently of the other coil stator assembly and independently of the hub assembly 616.

The magnets within the two arrays of permanent magnets are arranged with respect to each other so as to generate axially-directed magnetic fields that reverse direction at regular intervals as one moves around the annular region of the disk. These axially-directed magnetic fields produced by the arrays of magnets intersect radially-oriented windings of the coils 612 on the coil assembly 608. When currents are passed through the coil windings, the interaction of the currents with the magnetic fields produces a Lorentz force on the magnetic rotor assembly 608 and the coil stator assembly 606. That force, which is tangentially-directed, applies a torque to the disks causing them to rotate, with the disk of the magnetic rotor assembly 608 urged to rotate in one direction about the crankshaft 603a and the disk of the coil stator assemblies urged to rotate in the opposite direction about the crankshaft 603a.

When the electric drive motor is coupled to the arrangement of linkages as previously described, the magnetic rotor assemblies are free to spin about the crankshaft; however, each coil stator assembly is limited by the linkages to operate only within a limited range of rotation. The magnetic rotor assemblies 608 are primarily used to apply torque to a wheel to which they are coupled; while the coil stator assemblies 606 are primarily used to apply torque to the linkages to thereby alter their orientation with respect to each other, as previously described.

An embodiment that incorporates the multi-bar linkage drive system into a wheel, such as might be used in a vehicle, is shown in FIGS. 8-12B. The motorized wheel assembly 800 includes a tire 804 that is mounted on a rim 806. The dual axial flux motor is housed within the space surrounded by the rim 806 and is coupled to a multi-bar linkage system 801 that is similar in design to what has already been described.

Referring also to FIG. 10, the multi-bar linkage system 801 includes a support structure 807 that is attached to the suspension of the vehicle by means of a coupling 809. At one end of the support structure 807 there is a swing arm 815 that is attached to the support structure 807 by a spring-loaded bearing mechanism 816. At the other end of the support structure 807 there is another swing arm 820 that is attached to the support structure by another spring-loaded bearing mechanism 817.

Without the springs in the spring-loaded bearing structures 816 and 817, the drive system will physically settle to a position in which the chassis or vehicle to which the drive system is attached is closest to the ground (i.e., the swing arms 815 and 820 will by in their uppermost position) when no electrical power is being applied to the drive system. The springs in the spring-loaded bearing assemblies 816 and 817 will hold the drive system at an intermediate or normal position without having to constantly supply power to the drive motor to accomplish that task.

The ends of each swing arms 815 and 820 that are opposite to where the bearing structures 817 and 816, respectively, are rotatably coupled to a crank assembly 834. Crank assembly 834 is made up of a crankshaft 803a with two crank arms 803b and 803c, one at each end of the crankshaft 803a. The crankshaft 803a supports two sets of bearing 818 and 824. Bearings 818 rotatably support a hub assembly 810 (see FIGS. 11A and 11B) on which magnetic rotor assemblies 812 are mounted and bearings 824 rotatably support housings 822 (see FIGS. 8 and 9) which hold coil stator assemblies 814 between the magnetic rotor assemblies 812. The bearings 818 enable the hub assembly 810, to which all of the magnetic rotor assemblies 812 are attached, to rotate about the crankshaft 803a. While the bearings 824 enable the support housings 822 along with their respective coil stator assemblies 814 to also rotate about the crankshaft 803a and independently of each other. Each housing 822 has a cover 842 through which cables pass to make connections to and supply dive signals to the supported coil stator assemblies 814.

Each magnetic rotor assembly 812 is made up of two disks 813 that are mechanically connected together. Each disk 813 holds an array of permanent magnets 826 arranged around an annular region of the disk 813. The magnetic moments of the permanent magnets are aligned axially and they periodically reverse direction as one moves around the circumference of the rotor assembly. The magnets 826 on one disk 813 are aligned with the magnets 826 on the other disk within the pair of disks and their magnetic moments point in the same direction to enhance the fields that the coils in the coil stator assembly sees.

Referring again to FIGS. 11A and 11B, hub assembly 810 is made of three parts: a rim support disk 809 sandwiched between a pair of rotor support assemblies 819 and fastened together by a ring of bolts 821. Each rotor support assembly 819 supports a pair of magnetic rotor assemblies 812. The coil stator assemblies 814 (see FIGS. 12A and 12B) are positioned between each pair of magnetic rotor assemblies 812. The hub assembly 810 defines a bore 811 through which the crankshaft 803a, along with bearing 818 and 824, passes.

Each swing arm 815 and 820 includes a wing extension plate 830 bolted to the end of the swing arm that is coupled to the crankshaft assembly 834. The wing extension plates 830 provide two points at which torque links 832 are connected to the swing arms. The other ends of the torque links are connected to the housing 822. As explained earlier, the torque links 832 provide a way by which torque generated by the coil stator assemblies 814 is transferred to the swing arms 815 and 820.

Figure 13:
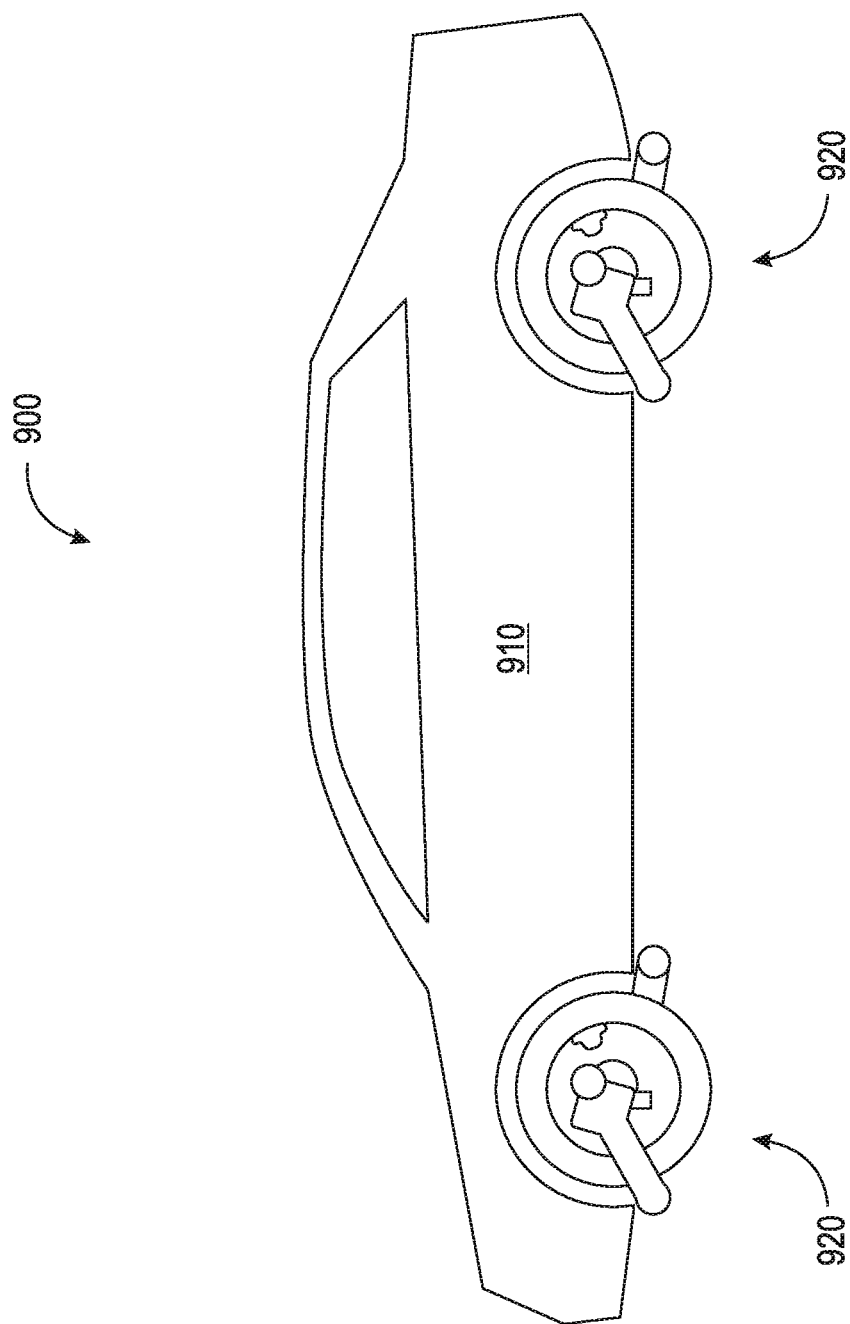
FIG. 13 is a schematic diagram illustrating a vehicle using the multi-bar linkage drive system shown in FIG. 8.

FIG. 13 is a schematic diagram of a vehicle 900 that includes four multi-bar linkage drive systems 920, such as were described earlier, mounted on a passenger-carrying body or chassis 910. In this example, each drive system 920 occupies the space that would normally be occupied by a typical vehicle wheel assembly. Although this particular example is characterized as having four multi-bar linkage drive systems 920, it could have only two such drives, either in the front or in the back. Moreover, other types of vehicles that utilize the multi-linkage drive system can be envisioned. For example, vehicles with one, two, three or more wheels can be envisioned in which one or more of the wheels is implemented using the multi-bar linkage drive system.

Figure 14:
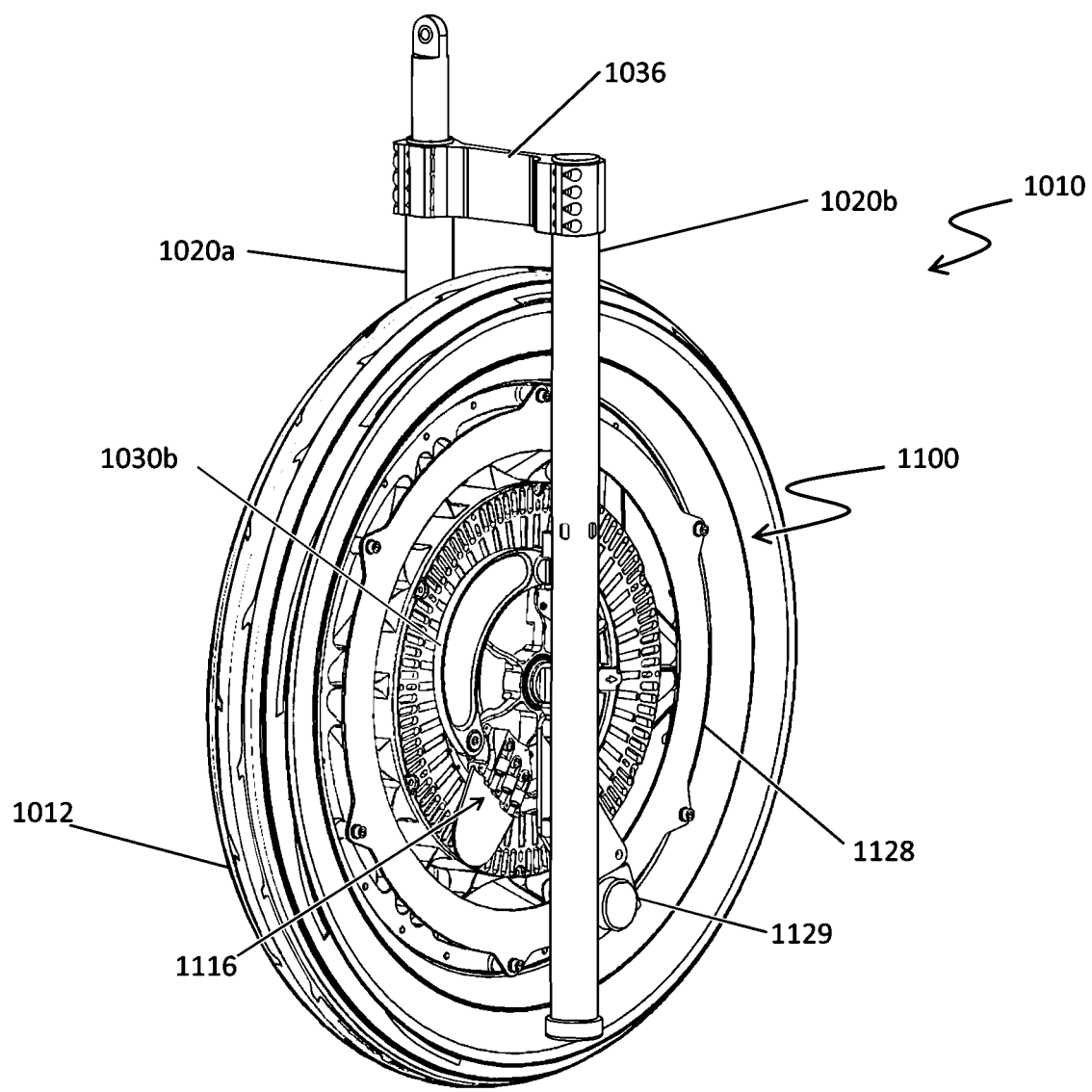
FIG. 14 illustrates another embodiment of an integrated wheel and suspension assembly.

FIG. 14 shows another embodiment of an integrated wheel and suspension assembly 1010 that is capable of producing both rotational movement of a tire 1012 to propel a vehicle forward and translational (i.e., up and down) movement of the tire to provide part of an active suspension for the vehicle on which the wheel and suspension assembly 1010 is mounted. It includes an axial flux electric motor assembly 1100 supported by a suspension fork that has two suspension arms 1020a and 1020b in which the motor assembly 1100 is slidably mounted so that it can slide up and down under control of the motor assembly. A pair of crescent-shaped linkages 1030a and 1030b, only one of which is visible in FIG. 14, physically connects a rotatable part of the electric motor assembly to anchor points on the suspension arms 1020a and 1020b. A connecting bracket 1036 near the upper end of the suspension arms 1020a and 1020b clamps onto each of the arms 1020a and 1020b and rigidly holds them in a fixed position relative to each other.

Figure 15:
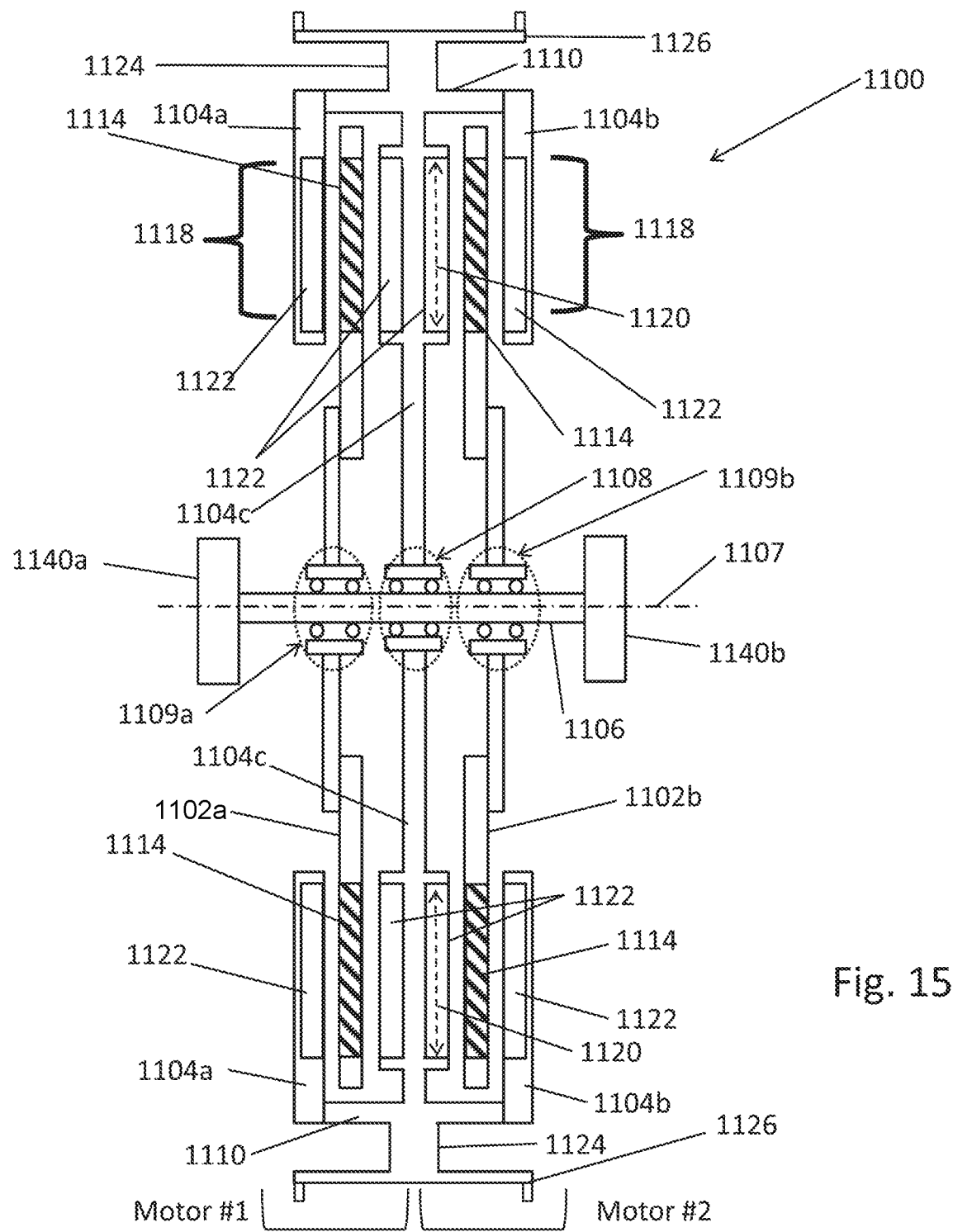
FIG. 15 is a cross-sectional view of a schematic representation of the axial flux motor employed in the integrated wheel and suspension assembly of FIG. 14.

Referring to FIG. 15, motor assembly 1100 includes two coil stator assemblies 1102a and 1102b and a magnetic rotor assembly made up of three magnetic rotors including outer magnetic rotors 1104a and 1104b and a central magnetic rotor 1104c. One coil stator assembly 1102a is sandwiched between and spaced apart from magnetic rotors 1104a and 1104c, and the other coil stator assembly 1102b sandwiched between and spaced apart from magnetic rotors 1104c and 1104b. Each of the outer magnetic rotors 1104a and 1104b is a generally circular, ring-shaped structure that is arranged along a hub assembly or central cylindrical spindle 1106 with its axis aligned with the axis of the spindle 1106. The central magnetic rotor 1104c is mounted on the spindle 1106 through a bearing assembly 1108 so that it can freely rotate about a rotational axis 1107 that in this case defined by the axis of the spindle 1106. Around the perimeter of the central magnetic rotor 1104c, there is a cylindrically shaped collar 1110 to which the other two magnetic rotors 1104a and 1104b are attached, with one magnetic rotor 1104a on one side of the collar 1110 and the other magnetic rotor 1104b on the other side of the collar 1110. With this arrangement, the two outer magnetic rotors 1104a and 1104b rotate with the central magnetic rotor 1104c about the rotational axis and the spindle 1106.

Each of the coil stator assemblies 1102a and 1102b, which are also generally disc-shaped structures, is also mounted on the spindle 1106 by bearing assemblies 1109a and 1109b, respectively, so that they too can rotate about the rotational axis defined by the axis of the spindle 1106 independent of each other and independent of the magnetic rotor assembly. Each coil stator assembly 1102a and 1102b has an annular region 1112 and within that annular region 1112 there is an array of coils 1114 distributed around the disk. As shown in FIGS. 14 and 15, there is also a connector 1116 for electrically connecting to the coils within the array of coils and through which drive signals are delivered to those coils. The coils are fabricated or wound to produce generally radially oriented current paths through which drive currents are passed to operate the motor.

Each outer magnetic rotor 1104a and 1104c is ring-shaped and has an annular region 1118, and central magnetic rotor 1104c is disk-shaped and has an annular region 1120. When the three magnetic rotors are mounted on the spindle 1106, these annular regions 1118 and 1120 are generally aligned with the annular regions 1112 of the coil stator assemblies 1102a and 1102b. Around each magnetic rotor and within the annular regions there is an array of permanent magnets 1122. As will be described in greater detail shortly, the magnets 1122 are arranged to produce an axially directed magnetic field that intersects the coil windings of the coil stator assemblies and that alternates from one axial direction to the opposite axial direction as one moves around the rotor.

The described embodiment also includes a spoke assembly 1124 circumscribing and extending away from the collar 1110 and supporting a rim 1126 onto which a tire (not shown) could be mounted. A spoke assembly is used instead of a solid ring of material as a weight savings measure. There is also a brake disk 1128 attached to the spoke assembly 1124 as well as a brake calipers 1129 mounted on the suspension arm 1020b.

The motor assembly can be viewed as two, coaxially arranged axial flux motors that are coupled together along a common rotational axis. This is indicated in FIG. 15 as Motor #1 on the left and Motor #2 on the right. Motor #1 is represented by coil stator assembly 1102a sandwiched between magnetic rotor 1104a and the left half of magnetic rotor 1104c and Motor #2 is represented by coil stator assembly 1102b sandwiched between the right half of magnetic rotor 1104c and magnetic rotor 1104b. In this case, the magnetic rotors are all connected together so that they rotate together.

How the motor assembly 1100 is integrated into the integrated wheel and suspension assembly 1010 and how the overall system operates to produce both rotational and translational motion will now be described with reference to FIGS. 16, 17, 18A, and 18B.

Figure 22:
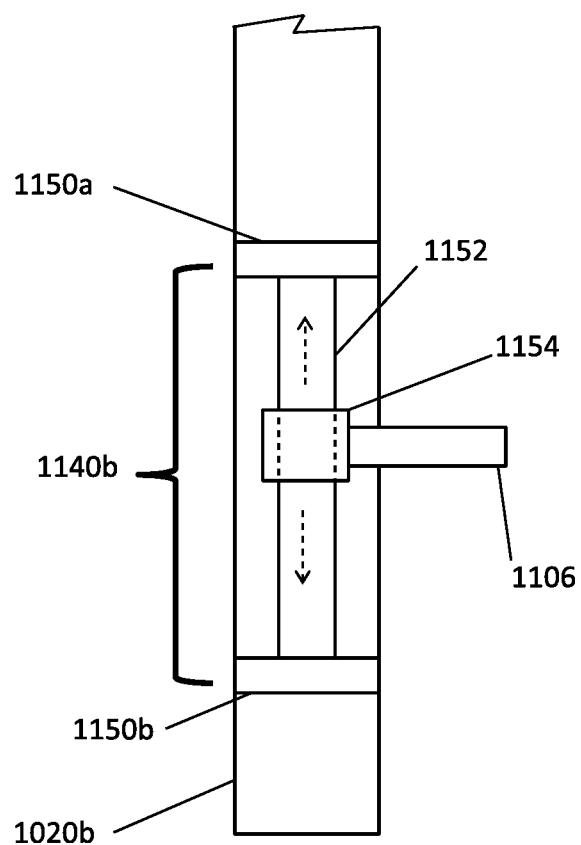
FIG. 22 shows details of the linear bearing in the suspension arm and to which the spindle is connected.

At the ends of the spindle 1106 there are two linear bearings 1140a and 1140b that are held within hollow regions inside of suspension arms 1020a and 1020b, respectively. The linear bearings 1140a and 1140b can slide up and down within their respective suspension arms 1020a and 1020b, thereby enabling the spindle 1106 to also move up and down. The linear bearing 1140b of the described embodiment is shown in greater detail in FIG. 22. It includes two blocks 1150a and 1150b that are fixed within the hollow space inside of the arm 1020b. Between and rigidly connected to the two blocks 1150a and 1150b there is a cylindrical guide 1152. A collar bearing 1154 circumscribes the guide 1152 and is able to ride up and down the guide 1152. The spindle 1106 which supports the motor and the wheel is connected to the collar bearing 1154.

Returning to FIGS. 18A and 18B, the crescent-shaped linkage 1030a connects between fixed locations on the suspension arm 1020a and coil stator assembly 1102a. The connection to the suspension arm 1020a is through a bearing mount 1142a and to the coil stator assembly 1102a through another bearing mount 1144a. Similarly, the crescent-shaped linkage 1030b connects between fixed locations on the suspension arm 1020b and coil stator assembly 1102b. The connection to the suspension arm 1020b is through a bearing mount 1142b and to the coil stator assembly 1102b through another bearing mount 1144b.

The crescent-shaped linkages are attached to the suspension arms and the coil stator assemblies so that there is rotational symmetry between them about a vertical axis 1146 that intersects the axis of the spindle 1106. That is, if the wheel and suspension assembly 1010 is rotated 180° about that axis 1146, the position of the linkages and their attachment points will appear the same.

Figure 18B:
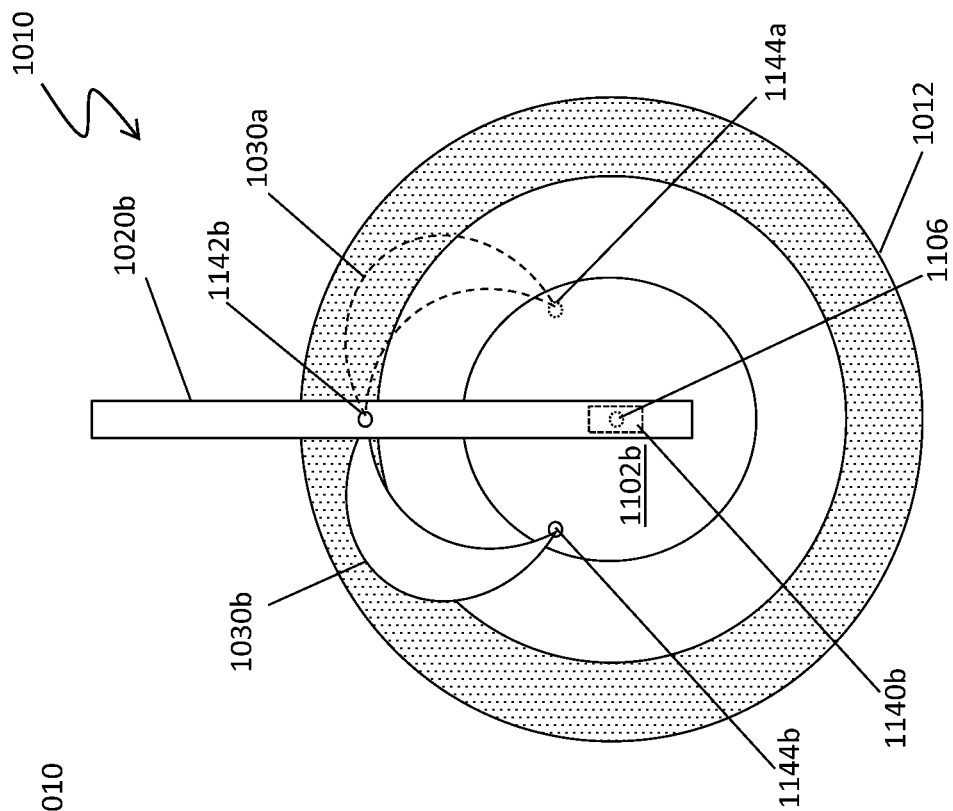
FIGS. 18A and 18B are side views of schematic representations of the integrated wheel and suspension assembly of FIG. 14 which illustrate the operation of the linkage arrangement during a common mode of operation.
Figure 18A:
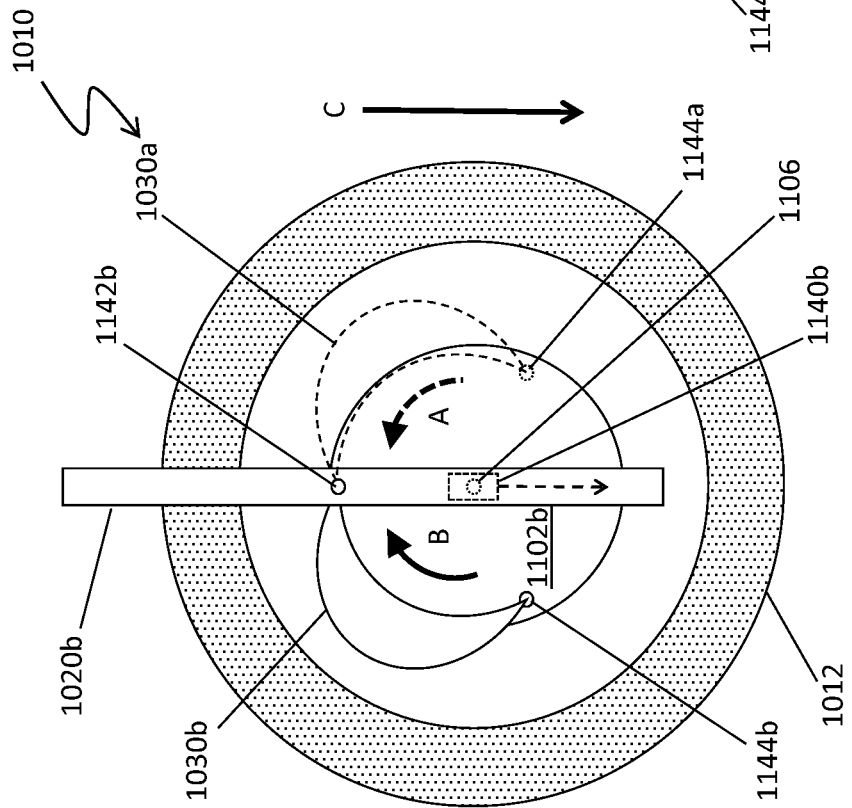

Notice that the linkages cause the wheel to move in the following way. If the coil stator assembly 1102b is rotated in a clockwise direction by a certain amount, as shown in FIG. 18A, this will have two results. It will push the spindle 1106 and bearings 1140a and 1140b in a downward direction within the suspension arms 1020a and 1020b. And it will cause the coil stator assembly 1102a to rotate in a counterclockwise direction by an equal amount. The resulting configuration will be as shown in FIG. 18B.

This has implications with regard to how the system operates when drive currents are applied to the coil stator assemblies 1102a and 1102b. First, assume that drive currents are applied to coil stator assembly 1102a to produce a torque that urges the coil stator assembly 1102a to rotate in a counterclockwise direction (as indicated by the arrow identified by the letter A) and the magnetic rotor assembly (plus the wheel) to rotate in clockwise direction. Also assume that drive currents are applied to the coil stator assembly 1102b to produce a torque that urges the coil stator assembly 1102b to rotate in a clockwise direction (as indicated by the arrow identified by the letter B) and the magnetic rotor assembly (plus the wheel) to rotate in counterclockwise direction. If the resulting torques produced by the drive currents applied to coil stator assemblies 1102a and 1102b are equal in magnitude, the torque produced on the magnetic rotor assembly by the coil stator assembly 1102a will be exactly counterbalanced by the torque produced on the magnetic rotor assembly by the coil stator assembly 1102b. Thus, the magnetic rotor assembly will experience a net torque of zero and it along with the attached wheel will not rotate but will remain stationary. However, the coil stator assemblies 1102a and 1102b will be caused to rotate in opposite directions from each other as indicated by the arrows. This will, by virtue of the linkages 1030a and 1030b, push the spindle 1106, and the attached tire, downward or conversely; it will push the vehicle, to which the suspension arms are attached, upward.

Figure 19:
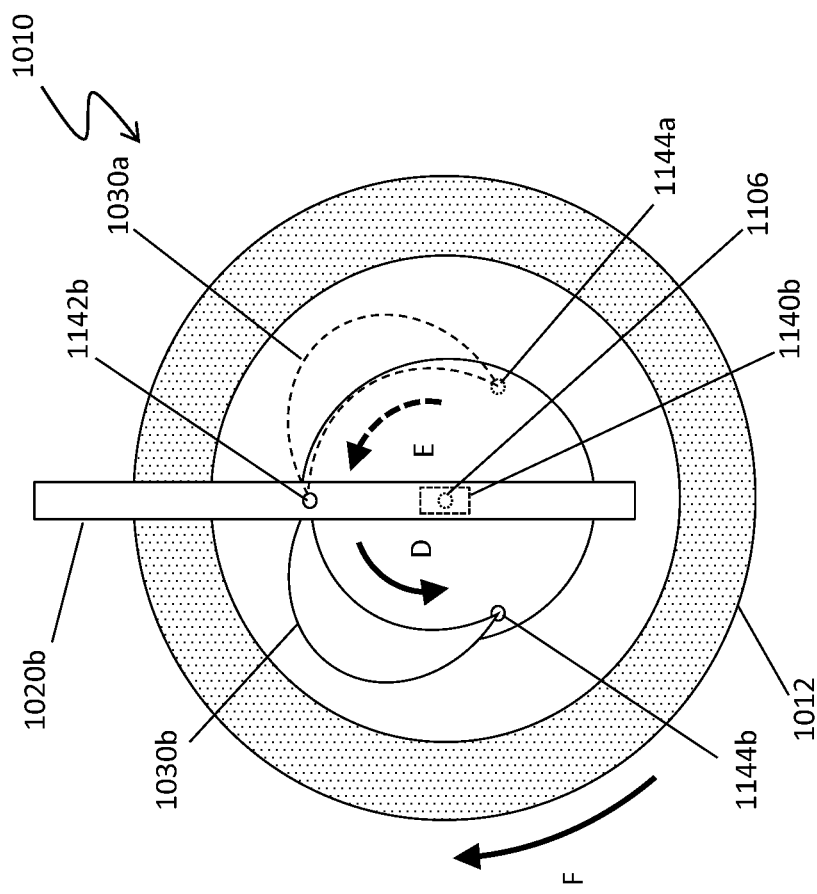
FIG. 19 is a side view of a schematic representation of the integrated wheel and suspension assembly of FIG. 14, which illustrates the operation of the linkage arrangement during a differential mode of operation.

Now consider another mode of operation, which will be described with the help of FIG. 19. In this case, assume the drive currents applied to the coil stator assemblies 1102a and 1102b are such that they both urge the magnetic rotor assembly to rotate in the same direction. More specifically, the drive currents applied to coil stator assembly 1102a urge the magnetic rotor assembly to rotate in a clockwise direction while they also urge the coil stator assembly 1102a to rotate in a counterclockwise direction (as illustrated by the arrow identified by letter E). And, the drive currents applied to the coil stator assembly 1102b urge the magnetic rotor assembly to rotate in a clockwise direction while they also urge the coil stator assembly 1102b to rotate in a counterclockwise direction (as illustrated by the arrow identified by letter E). The linkage 1030a will transfer the torque applied by coil stator assembly 1102a to the spindle 1106 urging it to move downward; while the linkage 1030b will transfer the torque applied by coil stator assembly 1102b to the spindle 1106 urging it to move upward. Assuming the drive currents applied to the coil stator assemblies 1102a and 1102b are selected so as to produce the same magnitude torques, the forces imposed on the spindle 1106 will exactly counterbalance each other and the spindle 1106 will remain stationary (i.e., it will move neither up nor down). On the other hand, since both coil stator assemblies 1102a and 1102b are urging the magnetic rotor assembly to rotate in the same direction, the wheel will turn in that direction.

In summary, there are two modes of operation: one that will be called a common mode of operation and another that be called a differential mode of operation. In the common mode, the drive signals applied to the two coil stator assemblies produce torques on the magnetic rotor assembly that are equal and have the same sign. During purely common mode operation, the wheel rotates but there is no translational (up and down) movement of the wheel. In the differential mode, the drive signals applied to the two coil stator assemblies produce torques on the magnetic rotor assembly that are equal and have opposite signs. During purely differential mode operation the wheel does not rotate but there is a translational (up and down) movement of the wheel. By appropriately selecting the drive currents to the coil stator assemblies, a combination of both types of movement can be produced simultaneously.

Conceptually, the system of linkages just described can be viewed as two mechanical systems that work together to produce the translational movement of the wheel. One system is formed by the suspension fork and internal linear bearings that constrain the spindle to move along a predefined path, which in this case is a linear path. The other system is formed by an arrangement of linkages which converts the relative rotational movement of the two coil stator assemblies with respect to each other into translational movement of the spindle (or rotational element) along the predefined path defined by the suspension fork. Note that in the illustrated embodiment, the arrangement of linkages corresponds to a four-bar linkage arrangement.

The two mechanical systems are illustrated by FIGS. 20A and 20B. The linear bearing 1140b inside arm 1020b constrains the axis of the spindle 1106 to move up and down along a linear path defined by the guide within the linear bearing. The arrangement of linkages that moves the spindle along that path in response to torques generated by the electric motor is a multi-bar linkage mechanism that includes four bars or links 1180a, 1180b, 1182a, and 1182b. Two of the four links are represented by the elements connecting the coil stator assemblies to fixed locations on the suspension arms. On one side, there is the link 1180b between a point on the coil stator assembly 1102b that is located at a fixed distance from the axis of rotation of the coil stator assembly 1102b (represented by bearing mount 1144b) to an anchor point 1142b on the arm 1020b. On the other side (which is partly concealed in the side view presented in the figures), there is the link 1180a between a point on coil stator assembly 1102a that is located at a fixed distance from the axis of rotation of the coil stator assembly 1102a (represented by bearing mount 1144a) to anchor point 1142a on the arm 1020a. The remaining two links 1182a and 1182b are represented by the connections between the spindle 1106 and the bearing mounts 1144b and 1144a on the coil stator assemblies 1102b and 1102a, respectively. In FIGS. 20A and 20B, these two links are represented by the elements 1182b and 1182a. Note that the four links effectively have their ends connected together at hinged points. The coil stator assemblies 1102a and 1102b change the physical arrangement of the four links by applying appropriate torques to the links 1182a and 1182b, causing them to rotate thereby reconfiguring the links. The reconfiguration of the links forces the spindle to move along the linear path defined by the linear bearing.

Figure 23:
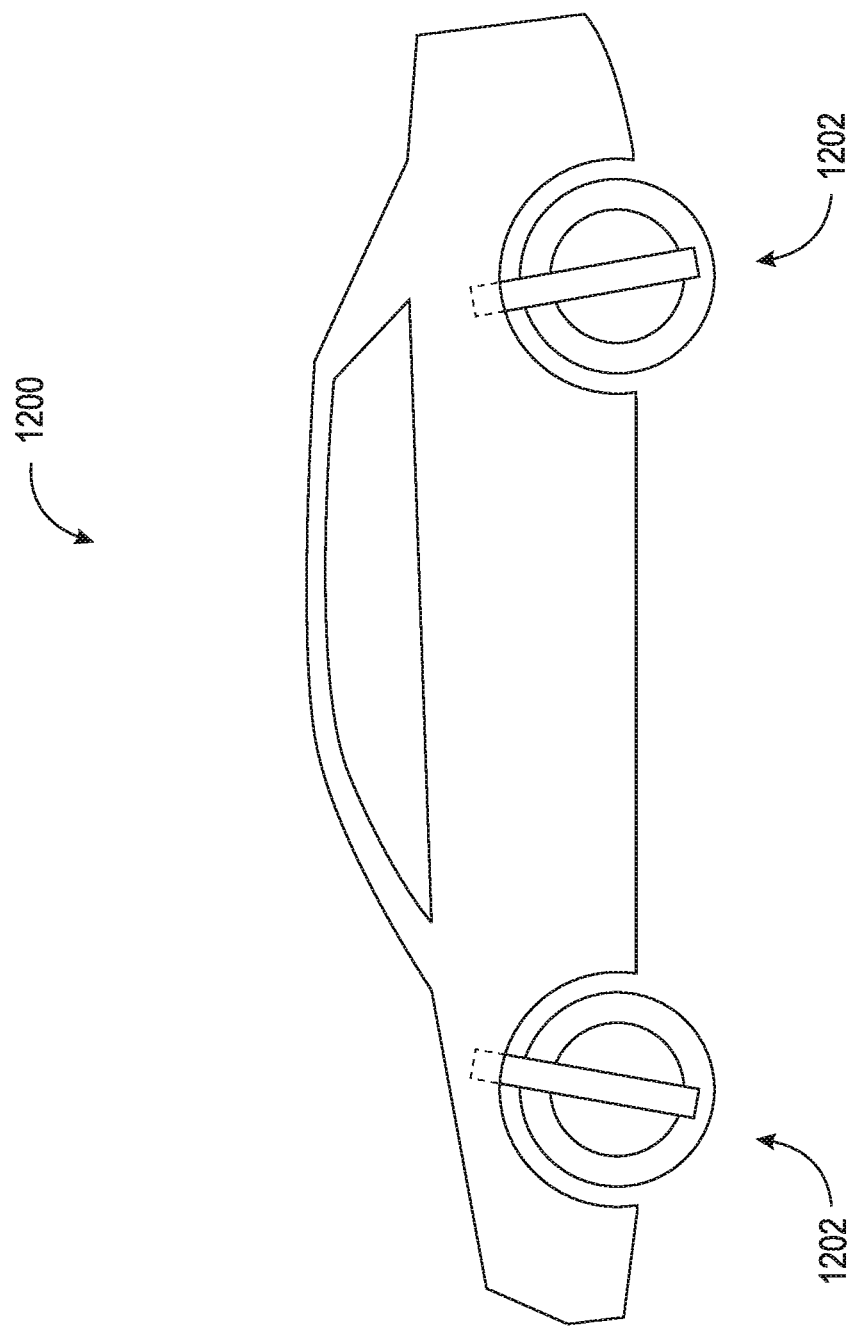
FIG. 23 shows a vehicle that employs the drive system illustrated in FIG. 19.

FIG. 23 depicts a vehicle 1200 that includes four electric motor drive systems 1202, one driving each of the four wheels (only two drive systems are shown in the side view). Each electric motor drive system 1202 occupies the space that would normally be occupied by a typical wheel and suspension assembly and is attached to the frame or body of the vehicle. Although the described embodiment includes four drive systems 1202, one for each wheel, the vehicle could employ the drive systems on only the front wheels (or on the rear wheels). Other embodiments include one, two and three-wheeled vehicles or personal transport systems with one or more wheels being driven by the electric motor drive system described herein.

Figure 21:
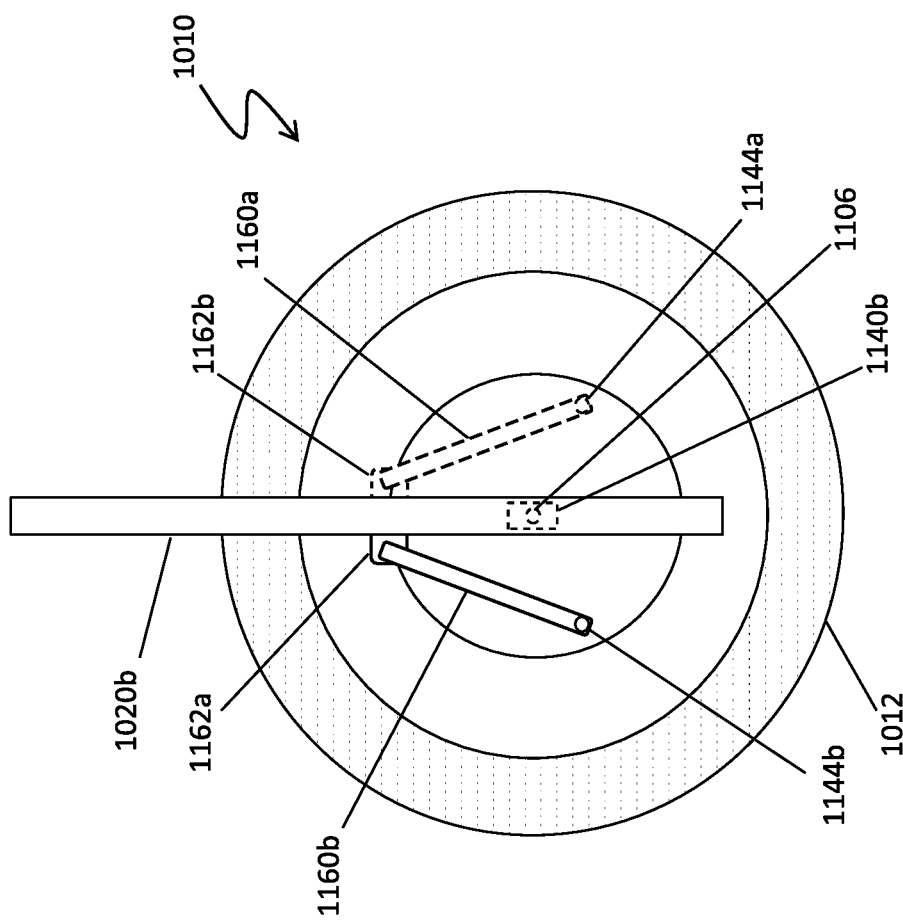
FIG. 21 shows an alternative arrangement for the links between the coil stator assemblies and the suspension arms.

In the embodiments described above, the linkages had a crescent shape and were anchored to points on suspension arms that aligned with each other. But the shape of the linkages and their anchor points are not particularly important. In the described embodiment, the crescent shape was chosen to satisfy certain physical constraints imposed by the illustrated design. Other shapes and/or arrangements are certainly possible. For example, referring to FIG. 21, straight bar linkages 1160a and 1160b are used and each of the linkages is anchored on a tab 1162a and 1162b, respectively, that extends away from the fork suspension member.

Note that in the described embodiment, each of the coil stator assemblies is connected to an anchor point on the support structure (i.e., suspension arms) by a corresponding linkage and the axle of the wheel is constrained to only move along a path defined by the linear bearing that slides within the suspension arm. The linear bearing is a specific example of a slide mechanism other embodiments of which could also be used. There are other ways that could be used besides slide mechanisms to constrain the movement of the axle to be along a predefined transverse path. For example, a simple swing arm or arrangement of swing arms could be used between the frame of the vehicle and the axel of the wheel. In that case, the up and down movement of the wheel would not be along a strictly linear path but rather the path would be curved with a radius defined by the length of the swing arm.

Figure 25A:
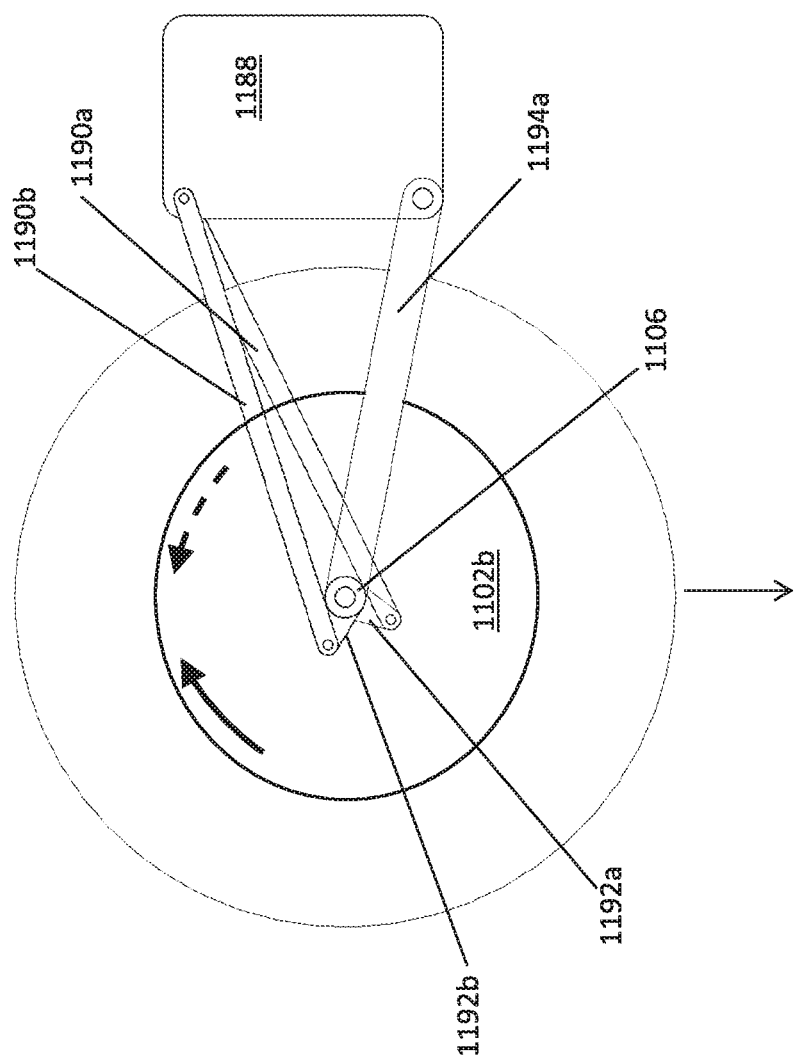
FIGS. 25A-C show an alternative guide mechanism which employs swing arms to define the path over which the rotational axis is permitted to move in a transverse direction.
Figure 25B:
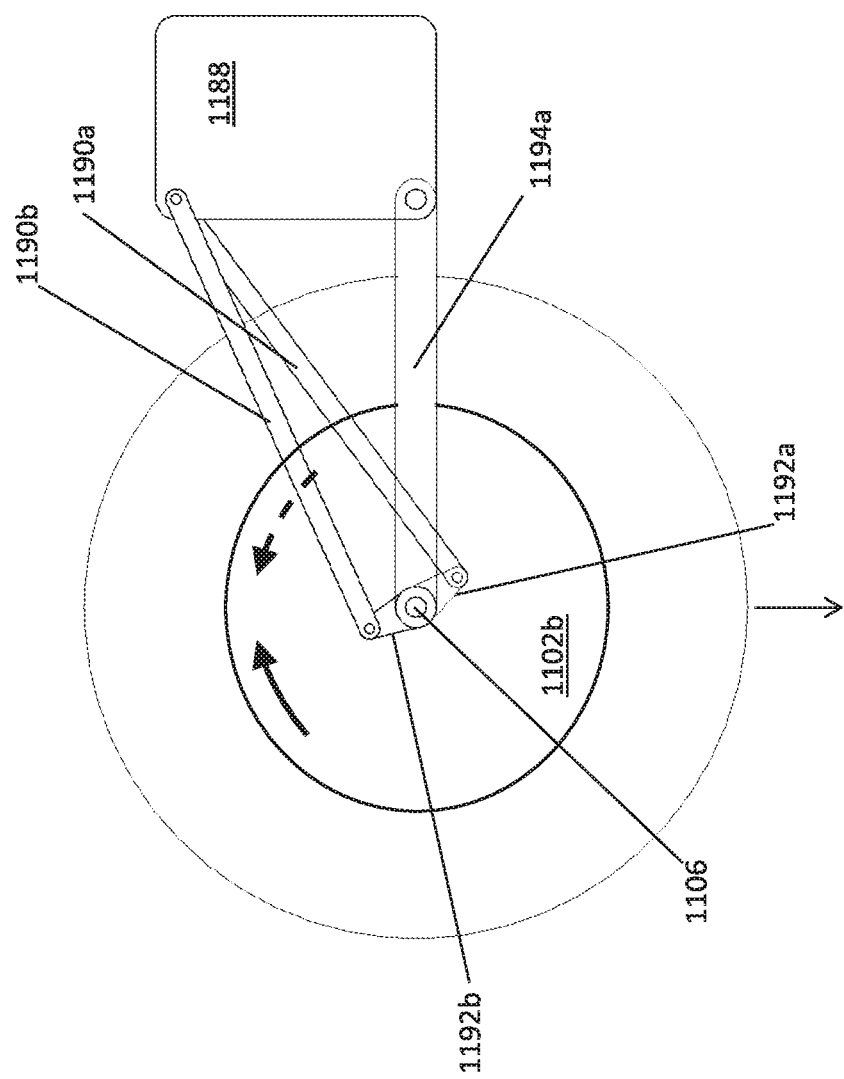
Figure 25C:
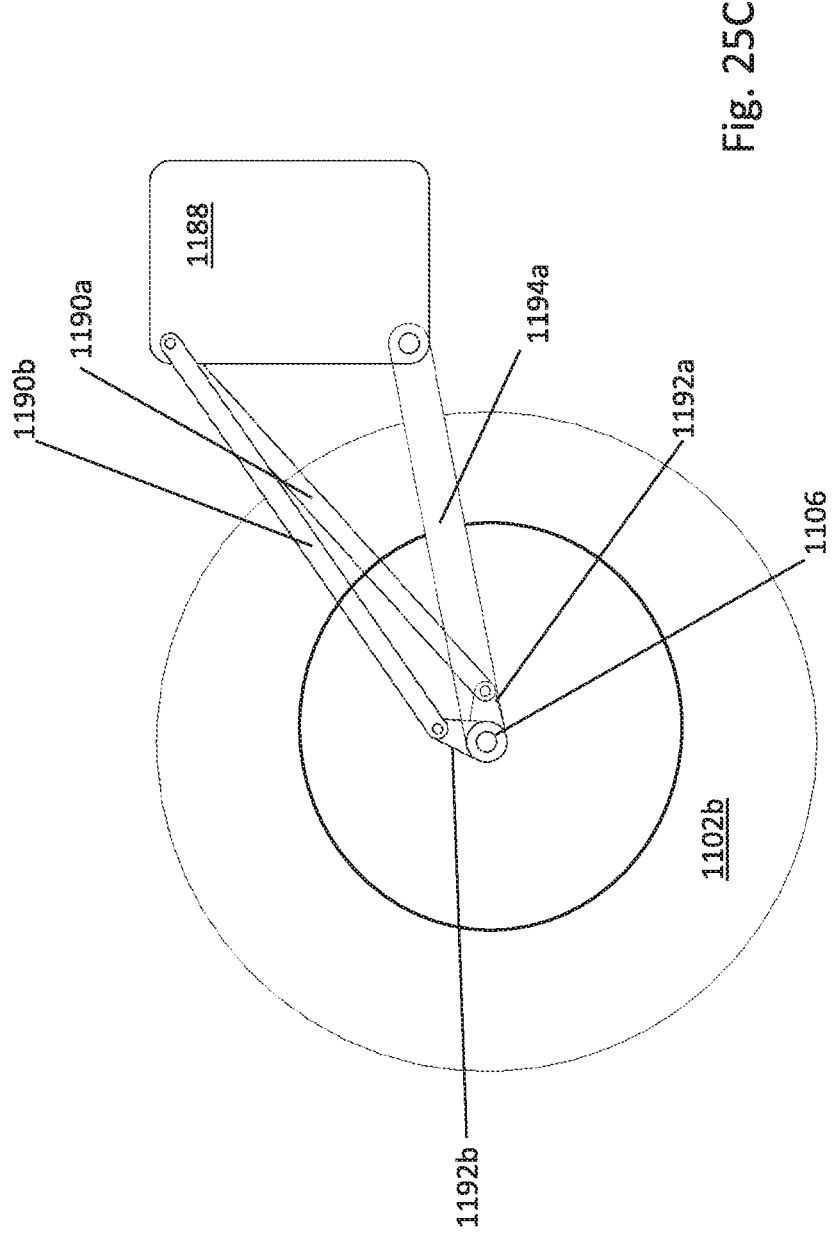

FIGS. 25A-C show an example of an embodiment that employs swing arms 1194 to define the path over which the axle 1106 is able to move, namely, an arc the radius of which is determined by the length of the swing arms 1194a and 1194b (which is visually obstructed by swing arm 1194a in the figures). The frame of the vehicle or the support to which the drive system is connected is represented by block 1188. The arrangement of linkages that moves the spindle 1106 along that path in response to torques generated by the electric motor is a multi-bar linkage mechanism that includes four bars or links 1190a, 1190b, 1192a, and 1192b. Two of the four links are represented by the elements connecting the coil stator assemblies to fixed locations on the frame 1188. On one side, there is the link 1190b between a point on the coil stator assembly 1102b that is located at a fixed distance from the axis of rotation of the coil stator assembly 1102b (represented by bearing mount 1194b) to an anchor point 1196b on the frame 1188. On the other side of the motor (which is partly concealed in the side view presented in the figures), there is the link 1190a between a point on coil stator assembly 1102a that is located at a fixed distance from the axis of rotation of the coil stator assembly 1102a (represented by bearing mount 1194a) to anchor point 1196a on the frame 1188. (Note that the two anchor points 1196a and 1196b on the frame 1188 are collinear and the same distance from the spindle 1106.) The remaining two links are represented by the connections between the spindle 1106 and the bearing mounts 1196b and 1196a on the coil stator assemblies 1102b and 1102a, respectively. In FIGS. 25A-C, these two links are represented by the elements 1192b and 1192a. Note that the four links effectively have their ends connected together at hinged points. The coil stator assemblies 1102a and 1102b change the physical arrangement of the four links by applying appropriate torques to the links 1192a and 1192b, causing them to rotate thereby reconfiguring the links. The reconfiguration of the links forces the spindle to move along the curved path defined by the swing arms 1194a and 1194b.

In the sequence shown in FIGS. 25A-C, as coil stator assembly 1102b rotates clockwise (as shown by the solid curved arrow) and coil stator assembly 1102a rotates counterclockwise (as shown by the dashed, curved arrow), the distance between the spindle 1106 and the anchor points of the links 1190a and 1190b increases and the wheel is pushed in a downward direction. Rotation of the coil stator assemblies in the opposite directions pulls the wheel up.

Still other well-known approaches are also possible. There are also multi-bar linkages that could be used, examples of which are well known to persons skilled in the art.

Also, it should be apparent from the foregoing description that the use of the word "stator," as for example in the case of the coil stator assembly, is not meant to imply that the element is stationary and incapable of rotation or movement. Often the word may be given this more limited meaning but that is not the intention when it is used herein. This should be apparent from the above description in which the coil stator assemblies also rotate about the rotational axis of the motor assembly.

Figure 24:
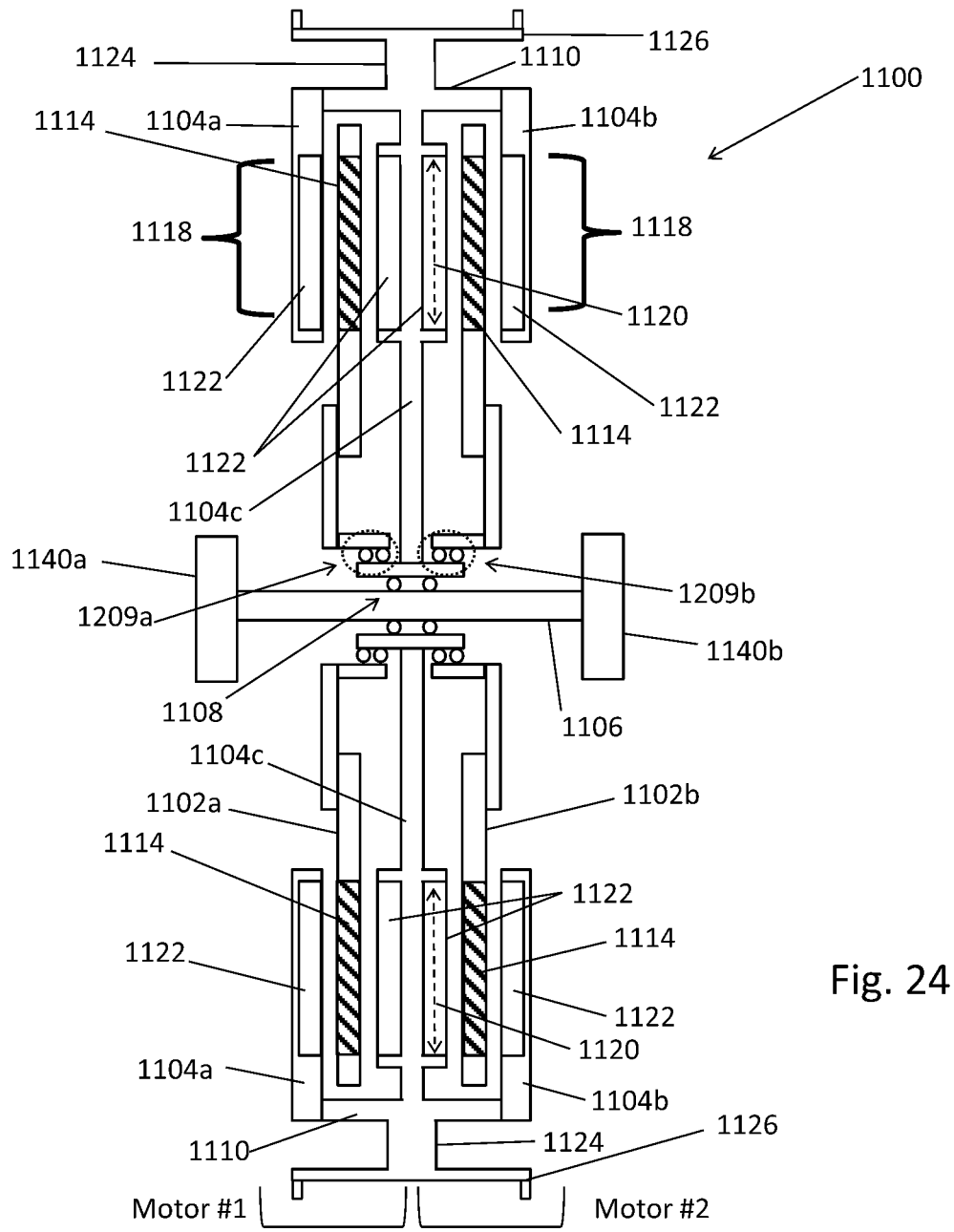
FIG. 24 shows an alternative arrangement of bearings for the electric motor depicted in FIG. 15.

It should be understood that the arrangement of bearings that are used in the described embodiment is just one of many alternatives that could be used and which enables the two coil stator assemblies and the magnetic rotor assembly to rotate about a rotational axis independently of each other. They need not all use the spindle as one of the bearing surfaces. FIG. 24 shows an alternative arrangement in which bearings 1209a and 1209b rotatably mount the coil stator assemblies on the magnetic rotor assembly. In addition, the hub assembly was represented by the spindle 1106 but it could be another arrangement that supports the two motors along their rotational axes.

Though the described embodiment referred specifically to using the second degree of freedom that is available from the drive system to provide an active suspension for a vehicle, that second degree of freedom could be used for other purposes depending on the application in which the drive system is used. For example, the drive system could be used as the motor for an airplane or other aircraft in which case the second degree of freedom could be used, for example, to control the pitch of the blades. If the drive system is used in machine equipment, the second degree of freedom could be used for other purposes requiring linear or translational movement of a part.

Other embodiments are within the claims. For example, though a specific four-bar linkage, namely, the Watt's linkage, was described, there are many other multi-bar linkage arrangements that exhibit similar behavior and that could be used in place of the Watt's linkage. Without intending to be limiting, other examples include multi-bar linkages having a number of linking bars that is different from four, the Chebyshev's linkage, and the Peaucellier-Lipkin linkage. In addition, electric motors other than axial flux motors could be used including, for example, other types of electrical motors that have magnetic rotors and coil stator assemblies, or coil rotors and magnetic stator assemblies, or electric motors that are based on switched reluctance technology, or commutators, or single or multi-phased drives, or DC drives, etc.

While example embodiments have been particularly shown and described, it will be understood by those skilled in the art that various changes in form and details may be made therein without departing from the scope of the embodiments encompassed by the appended claims.

What is claimed is:

1. An electric drive system comprising:
a rotary motor system comprising a hub assembly, a magnetic rotor assembly, a first coil stator assembly, and a second coil stator assembly, wherein the hub assembly defines a rotational axis and wherein each of the magnetic rotor assembly, the first coil stator assembly, and the second coil stator assembly is coaxially aligned with the rotational axis and is capable of rotational movement about the rotational axis; and
a multi-bar linkage mechanism connected to each of the first and second coil stator assemblies and connected to the hub assembly, said multi-bar linkage mechanism constraining movement of the hub assembly so that the rotational axis of the hub assembly moves along a defined path that is in a transverse direction relative to the rotational axis and wherein the multi-bar linkage mechanism causes the rotational axis of the hub assembly to translate along the defined path in response to relative rotation of the first coil stator assembly and the second coil stator assembly with respect to each other,
wherein the multi-bar linkage comprises a first swing arm rotatably coupled to the first stator assembly on a first side of the magnetic rotor assembly, a second swing arm rotatably coupled to the second stator assembly on a second side of the magnetic rotor assembly, and a member parallel to the rotational axis and rotatably coupled to the first swing arm and rotatably coupled to the second swing arm.

2. An electric drive system comprising:
a rotary motor system comprising a hub assembly, a magnetic rotor assembly, a first coil stator assembly, and a second coil stator assembly, wherein the hub assembly defines a rotational axis and wherein each of the magnetic rotor assembly, the first coil stator assembly, and the second coil stator assembly is coaxially aligned with the rotational axis and is capable of rotational movement about the rotational axis;
a multi-bar linkage mechanism connected to each of the first and second coil stator assemblies and connected to the hub assembly, said multi-bar linkage mechanism constraining movement of the hub assembly so that the rotational axis of the hub assembly moves along a defined path that is in a transverse direction relative to the rotational axis and wherein the multi-bar linkage mechanism causes the rotational axis of the hub assembly to translate along the defined path in response to relative rotation of the first coil stator assembly and the second coil stator assembly with respect to each other; and
a first torque link connecting the first coil stator assembly to the multi-bar linkage mechanism and a second torque link connecting the second coil stator assembly to the multi-bar linkage mechanism, the first and second torque links limiting rotation of the first and second coil stator assemblies to within a range of permitted rotations.

3. The electric drive system of claim 2, wherein the multi-bar linkage mechanism is a four-bar linkage mechanism.

4. The electric drive system of claim 3, wherein the four-bar linkage mechanism is a Watt's linkage mechanism.

5. The electric drive system of claim 2, wherein the multi-bar linkage mechanism comprises a support structure, a crankshaft assembly, a first swing arm, and a second swing arm, wherein the first swing arm has a first end rotatably connected to the crankshaft assembly and a second end rotatably connected to the support structure at a first location on the support structure, and wherein the second swing arm has a first end rotatably connected to the crankshaft assembly and a second end rotatably connected to the support structure at a second location on the support structure that is different from the first location on the support structure.

6. The electric drive system of claim 5, wherein the crankshaft assembly comprises the hub assembly.

7. The electric drive system of claim 5, wherein the crankshaft assembly includes a crankshaft, a first crank arm extending in a first radial direction away from the crankshaft, and a second crank arm extending in a second radial direction away from the crankshaft.

8. The electric drive system of claim 7, wherein the first crank arm and the second crank arm are located at opposite ends of the crankshaft.

9. The electric drive system of claim 7, wherein the first radial direction is opposite to the second radial direction.

10. The electric drive system of claim 2, further comprising a wheel rim circumscribing the rotational axis and wherein the magnetic rotor assembly is coupled to the wheel rim so that the wheel rim rotates about the rotational axis along with the magnetic rotor assembly.

11. The electric drive system of claim 10, wherein the wheel rim circumscribes the rotary motor system.

12. The electric drive system of claim 2, wherein the rotary motor system comprises:
a first electric motor including a first magnetic rotor, the first coil stator assembly, a rotor bearing assembly enabling the first magnetic rotor to rotate about the rotational axis, and a first coil bearing assembly enabling the first coil stator assembly to rotate about the rotational axis independent of the first magnetic rotor; and
a second electric motor including a second magnetic rotor, the second coil stator assembly, and a second coil bearing assembly enabling the second coil stator assembly to rotate about the rotational axis independent of the first magnetic rotor and independent of the first coil stator assembly, wherein the magnetic rotor assembly comprises the first and second magnetic rotors coupled to each other to rotate together about the rotational axis.

13. The electric drive system of claim 12, wherein the first and second electric motors are axial flux motors.

14. A vehicle comprising:
a chassis; and
a plurality of wheel assemblies at least one of which comprises:
a rotary motor system comprising a hub assembly, a magnetic rotor assembly, a first coil stator assembly, and a second coil stator assembly, wherein the hub assembly defines a rotational axis and wherein each of the magnetic rotor assembly, the first coil stator assembly, and the second coil stator assembly is coaxially aligned with the rotational axis and is capable of rotational movement about the rotational axis independent of each other; and
a multi-bar linkage mechanism connected to each of the first and second coil stator assemblies and connected to the hub assembly, said multi-bar linkage mechanism constraining movement of the hub assembly so that the rotational axis of the hub assembly moves along a defined path that is in a transverse direction relative to the rotational axis and wherein the multi-bar linkage mechanism causes the rotational axis of the hub assembly to translate along the defined path in response to relative rotation of the first coil stator assembly and second coil stator assembly with respect to each other;
a wheel rim circumscribing the rotational axis and wherein the magnetic rotor assembly is coupled to the wheel rim so that the wheel rim rotates about the rotational axis along with the magnetic rotor assembly; and
a first torque link connecting the first coil stator assembly to the multi-bar linkage mechanism and a second torque link connecting the second coil stator assembly to the multi-bar linkage mechanism, the first and second torque links limiting rotation of the first and second coil stator assemblies to within a range of permitted rotations.

15. The vehicle of claim 14, wherein the multi-bar linkage mechanism is a four-bar linkage mechanism.

16. The vehicle of claim 15, wherein the four-bar linkage mechanism is a Watt's linkage mechanism.

17. The vehicle of claim 14, wherein the multi-bar linkage mechanism comprises a support structure, a crankshaft assembly, a first swing arm, and a second swing arm, wherein the first swing arm has a first end rotatably connected to the crankshaft assembly and a second end rotatably connected to the support structure at a first location on the support structure, and wherein the second swing arm has a first end rotatably connected to the crankshaft assembly and a second end rotatably connected to the support structure at a second location on the support structure that is different from the first location on the support structure.

18. The vehicle of claim 17, wherein the crankshaft assembly comprises the hub assembly.

19. The vehicle of claim 17, wherein the crankshaft assembly includes a crankshaft, a first crank arm extending in a first radial direction away from the crankshaft, and a second crank arm extending in a second radial direction away from the crankshaft.

20. The vehicle of claim 19, wherein the first crank arm and the second crank arm are located at opposite ends of the crankshaft.

21. The vehicle of claim 19, wherein the first radial direction is opposite to the second radial direction.

22. The vehicle of claim 14, wherein the rotary motor system comprises:
a first electric motor including a first magnetic rotor, the first coil stator assembly, a rotor bearing assembly enabling the first magnetic rotor to rotate about the rotational axis, and a first coil bearing assembly enabling the first coil stator assembly to rotate about the rotational axis independent of the first magnetic rotor; and
a second electric motor including a second magnetic rotor, the second coil stator assembly, and a second coil bearing assembly enabling the second coil stator assembly to rotate about the rotational axis independent of the first magnetic rotor and independent of the first coil stator assembly, wherein the magnetic rotor assembly comprises the first and second magnetic rotors coupled to each other to rotate together about the rotational axis.

* * * * *